March 31, 1970 R. K. COTTON ET AL 3,504,245

AUTOMATIC STORAGE AND RETRIEVAL SYSTEM

Filed Oct. 20, 1965 17 Sheets-Sheet 3

AUTOMATIC STORAGE AND RETRIEVAL SYSTEM

AUTOMATIC STORAGE AND RETRIEVAL SYSTEM

Filed Oct. 20, 1965 17 Sheets-Sheet 9

March 31, 1970 R. K. COTTON ET AL 3,504,245

AUTOMATIC STORAGE AND RETRIEVAL SYSTEM

Filed Oct. 20, 1965 17 Sheets-Sheet 12

STORE CYCLE

Fig. 19

RETRIEVE CYCLE

PROGRAM 10 | CARD 2
BRIDGE —— NO CODE
TROLLEY —— X24 (RETRIEVE)
HOIST —— NO CODE
ROTATE —— NO CODE
CHECK AISLE & ROTATE

PROGRAM 11 | CARD 2
BRIDGE —— X (RETRIEVE)
TROLLEY —— SAME AS PR 2
HOIST —— X (RETRIEVE)
ROTATE —— SAME AS PR 1
BRIDGE & HOIST TO RETRIEVE POSITION (SAME AISLE - SAME SIDE)

PROGRAM 11A | CARD 2
BRIDGE —— 4 (HOME)
TROLLEY —— 19 (ROTATE)
HOIST —— 9
ROTATE —— X
BRIDGE TO HOME - TROLLEY & HOIST TO ROTATE

PROGRAM 11B | CARD 2
BRIDGE —— 39 (MIDDLE AISLE)
TROLLEY —— 19 (ROTATE)
HOIST —— 9 (ROTATE)
ROTATE —— X1 (SOUTH)
BRIDGE TO MIDDLE AISLE TROLLEY & HOIST TO ROTATE

PROGRAM 12 | CARD 2
BRIDGE —— SAME AS PR 11
TROLLEY —— SAME AS PR 10
HOIST —— SAME AS PR 11
ROTATE —— SAME AS PR 11
NO MOTION

PROGRAM 12A | CARD 2
BRIDGE —— 4 (HOME)
TROLLEY —— SAME AS PR 10
HOIST —— 9
ROTATE —— SAME AS PR 11A
TROLLEY TO RETRIEVE AISLE

PROGRAM 12B | CARD 2
BRIDGE —— SAME AS PR11B
TROLLEY —— X24 (RETRIEVE)
HOIST —— SAME AS PR 11B
ROTATE —— SAME AS PR 11B
TROLLEY TO RETRIEVE AISLE

PROGRAM 13 | CARD 2
BRIDGE —— X30
TROLLEY —— SAME AS PR10
HOIST —— X12
ROTATE —— SAME AS PR 11B
BRIDGE & HOIST TO RETRIEVE BIN

PROGRAM 14 | CARD 2
BRIDGE —— SAME AS PR13
TROLLEY —— SAME AS PR10 & CTD
HOIST —— SAME AS PR13
ROTATE —— SAME AS PR 11B
MOVE TROLLEY INTO BIN

PROGRAM 15 | CARD 2
BRIDGE —— SAME AS PR 13
TROLLEY —— SAME AS PR10 & CTD
HOIST —— X13(1 POS. ABOVE PR13)
ROTATE —— SAME AS PR11B
RAISE HOIST & BACK INTO AISLE

PROGRAM 16 | CARD 2
BRIDGE —— X4 (HOME)
TROLLEY —— SAME AS PR10
HOIST —— X9 (ROTATE)
ROTATE —— SAME AS PR 11B
BRIDGE, HOIST & ROTATE (HOME)

PROGRAM 17 | CARD 2
BRIDGE —— SAME AS PR16
TROLLEY —— X9 (SET DOWN #1)
HOIST —— SAME AS PR16
ROTATE —— X2 (MIDDLE)
TROLLEY TO SET DOWN #1

PROGRAM 17A | CARD 2
BRIDGE —— SAME AS PR16
TROLLEY —— X19 (SET DOWN #2)
HOIST —— SAME AS PR16
ROTATE —— X2 (MIDDLE)
TROLLEY TO SET DOWN #2

PROGRAM 18 | CARD 2
BRIDGE —— SAME AS PR16
TROLLEY —— SAME AS PR16
HOIST —— X6
ROTATE —— SAME AS PR17
LOWER LOAD ONTO STATION

PROGRAM 18A | CARD 2
BRIDGE —— SAME AS PR16
TROLLEY —— SAME AS PR16
HOIST —— X6
ROTATE —— SAME AS PR17A
LOWER LOAD ONTO STATION

PROGRAM 19 | CARD 2
BRIDGE —— SAME AS PR16
TROLLEY —— SAME AS PR16
HOIST —— X9 (ROTATE)
ROTATE —— SAME AS PR17
AFTER TIME DELAY — RAISE FORKS TO ROTATE POSITION

PROGRAM 19A | CARD 2
BRIDGE —— SAME AS PR16
TROLLEY —— SAME AS PR16
HOIST —— X9 (ROTATE)
ROTATE —— SAME AS PR17A
AFTER TIME DELAY — RAISE FORKS TO ROTATE POSITION

PROGRAM 20 | CARD 2
BRIDGE —— SAME AS PR16
TROLLEY —— X34
HOIST —— SAME AS PR19
ROTATE —— SAME AS PR19
TROLLEY TO HOME POSITION

PROGRAM 21 | CARD 2
BRIDGE —— SAME AS PR16
TROLLEY —— SAME AS PR20
HOIST —— X6 (HOME)
ROTATE —— SAME AS PR19
LOWER FORKS TO PICK-UP ELEVATION & CLEAR SYSTEM

United States Patent Office 3,504,245

Patented Mar. 31, 1970

3,504,245
AUTOMATIC STORAGE AND RETRIEVAL SYSTEM

Ronald K. Cotton, Rockledge, Fla., and Barney O. Rae, Shorewood, Wis., assignors to Cutler-Hammer, Inc., Milwaukee, Wis., a corporation of Delaware Filed Oct. 20, 1965, Ser. No. 498,326
Int. Cl. G05b *15/02*
U.S. Cl. 318—18 11 Claims

ABSTRACT OF THE DISCLOSURE

An automatic warehouse system which allows an operator to sit at a fixed station and by placing punched cards into card readers and pressing a "GO" button can cause a fork to take one article from a pickup station into storage and to retrieve any other article from storage on its return trip and bring it to a selected set-down station and then return to the starting point. Depending upon the information punched on the card, it can skip either the storage or the retrieval operation and perform the other or it can cause the fork to move an article from any rack in the warehouse to any other rack without returning to the pickup or set-down stations. In performing these movements in three dimensions, the system is provided with apparatus which recalculates the position of the fork every step of the way so as to eliminate any error that may occur.

This invention relates to automatic storage and retrieval systems and more particularly to an electrical system for controlling multiple coordinate movements in three dimensions of a crane or the like to place articles in storage racks or bins of a warehouse and to remove articles therefrom under the control of punched cards or the like information bearing media.

While not limited thereto, the invention is especially applicable to control of the left or right and forward or back trolley and bridge movements, respectively, and the vertical and rotary hoist and fork movements, respectively, of a stacker crane.

Cranes of this type have heretofore been operated under manual control and under partial automatic control. Under manual control, the operator rides the fork so that he can see where it is going and from individual hand levers first runs the trolley in a cross aisle along the bridge to a point opposite the desired long aisle and rotates the fork, which may carry a twenty foot long bundle of metal bar stock, so that the load will fit into the long aisle. The operator then operates additional hand levers to run the bridge whereby to move the load down the aisle and to run the hoist to raise the load adjacent the desired rack. The operator then operates the trolley and hoist levers again to move the load over the rack, to lower the load onto the rack and to reverse the trolley back into the aisle. Under partial automatic control, a keyboard, dial or the like has been used to insert directive information into a control system which then controls the movements of the load-carrying fork. But these partial automatic control systems have been constructed and arranged on a counting basis so that after each operation, storing or retrieving as the case may be, the fork must return to the starting point before it can be sent out again on another errand. In these known systems, the directive information was put in initially and correct operation depended on its remaining sequentially accurate as stepping switches or the like were used. Thus, any error that might get in would give the device a false lead.

This invention relates to an automation system which allows the operator to sit at a fixed station and by merely placing punched cards (or equivalent information bearing media) into card readers or the like and pressing a "GO" button can cause the fork to take one article from the pickup station into storage and to retrieve any other article from storage and bring it to a selected set-down station before returning to the starting point or it can skip either the storage or retrieval operation. Or, depending upon the information punched on the cards, the system can cause the fork to move an article from any rack in the warehouse to any other rack without returning to the pickup or set-down stations. The invention has been devised to do this with the utmost reliability as will hereinafter appear.

An object of the invention is to provide an improved automation system for multiple coordinate motions control having greater reliability.

A more specific object of the invention is to provide an improved three dimensional motions control system which is continuously self-checking to avoid error.

Another specific object of the invention is to provide a motions control system of the aforesaid type which is constructed to provide better accuracy.

Another specific object of the invention is to provide a motions control system of the aforesaid type which recalculates its position every step of the way so that the system eliminates errors and always knows where it is.

Another specific object of the invention is to provide a motions control system of the aforesaid type which does the job faster because it can perform a second operation without coming to the home or starting point after the previous operation.

Another specific object of the invention is to provide a motions control system of the aforesaid type employing fully digital control which is especially adapted for sensing the direction in which it must move, for sensing how far away it is from its destination and for sensing slowdown points.

Another specific object of the invention is to provide an improved multiple coordinate, three dimensional control system for a stacker crane having optimum flexibility in that it is capable of performing a large number of functions.

A further specific object of the invention is to provide an improved numerical, direct static logic system for controlling interlocked movements of a multiple coordinate motions stacker crane from punched cards or similar digital code bearing media.

Other objects and advantages of the invention will hereinafter appear.

According to the invention, there is provided a direct static logic system for controlling a stacker crane, "direct" meaning that a positive input to a logic element produces a positive output and a zero input produces a zero output and no signal inversion takes place in any of the logic elements except the NOT logic element which purposely inverts the voltage.

The heart of the system is a digital computer of the binary code subtracting type which computes the directions and the distances every step of the way and the slowdown points at the proper times rather than relying on a less reliable sequencing scheme. This computer subtracts the desired-position indicative binary code from the actual-position indicative binary code for each of the bridge, the trolley and hoist and provides both a direction indicative signal at one of two possible outputs and a distance indicative difference binary code for controlling the respective motions. These subtractions are performed at predetermined steps along the way when the actual-position indicative binary codes are read so that any error which might have occurred at one point is completely eliminated when a new reading is taken and a new subtraction made. The desired-position indicative binary codes are obtained from punched cards by card readers and applied directly to the subtractor. Two card readers are used, one for storage codes and the other for retrieval codes to allow the crane to go from any place to any other place. The actual-position indicative binary codes are read from sets of magnetic code bars by proximity readers moving with the bridge, trolley and hoist, respectively, these sets of code bars being mounted along their respective paths of travel. Although difference binary codes of large magnitude are obtainable, since seven, six and six bit binary codes are used for the bridge, trolley and hoist, respectively, all codes larger than slowdown values function in the same way in conjunction with the direction indicative signal to cause continuous base speed operation whereas small difference binary codes such as equivalent decimal values of 3, 2 and 1 for the bridge and 2 and 1 for each of the trolley and hoist initiate slowdown action preparatory to stopping at zero difference, it being recognized that these small difference binary codes indicate that the moving device, as the case may be, is approaching its desired destination.

Rotary motion of the mast which mounts the article-supporting fork does not require computer control in the illustrated embodiment since its movements for warehousing application are relatively simple. That is, the fork has only three positions, a middle or westwardly directed position for loading and unloading purposes and north and south positions for the racks on opposite sides of the long aisle. The rotary position indicative codes, which are one hole codes for north or south or middle, are obtained from the punched cards by the card readers and are applied directly to the rotate motor control, the rotation being stopped at the proper position by limit switches.

The system is also provided with means for performing auxiliary functions including bypassing the storing or retrieving cycle under the control of a bypass card but allowing the other unbypassed cycle to take place; detecting a full rack or bin and returning the load to the pickup station; at the end of a storing cycle when the empty fork is in the long aisle adjacent the just-filled storage rack, determining whether the article to be retrieved is in a new aisle or side and if so, selecting another binary code program from the punched card which will cause movement of the bridge first to a cross aisle to allow shifting of the trolley or rotation of the fork; in conjunction with the above new aisle or side determination, selecting the nearest cross aisle for trolley shifting or fork rotation by choosing between two alternatives in the selected other binary code program, one of which will route the bridge back to the west (home) cross aisle when the just-filled storage bin is within a first range of bridge positions and the other of which will route the bridge to the middle cross aisle when the just-filled storage bin is beyond said range in the remaining bridge positions, it being assumed, of course, that these ranges of bridge positions are nearest the respective cross aisles; and selecting under manual control either one of two set-down stations to which the retrieved article is to be brought by selecting one of two retrieval programs from the punched card. Means for performing other particular auxiliary functions such as interlocks, lockouts, restrictions on certain movements, preset conditions, etc., will become apparent as the description proceeds.

These and other objects and advantages of the invention and the manner of obtaining them will best be understood by reference to the following description of an embodiment of an automatic storage and retrieval system taken in conjunction with the acompanying drawings, wherein.

Figure 20:
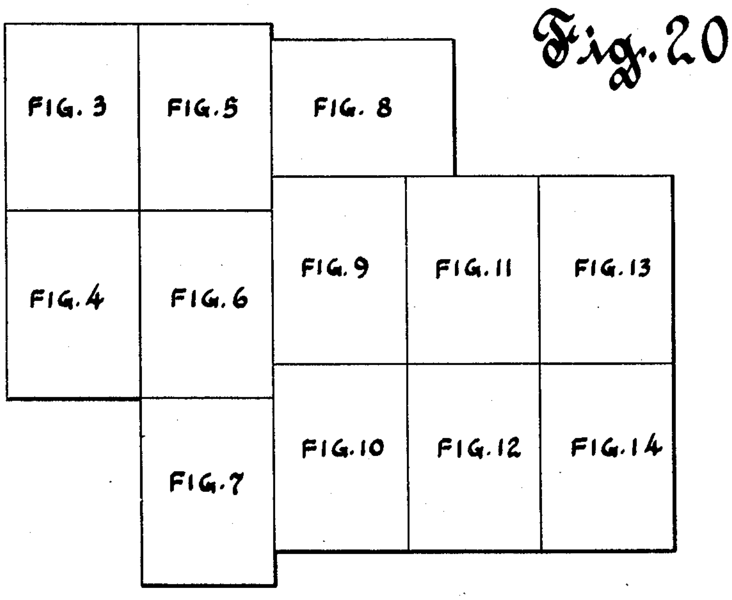
Figures 15, 17:
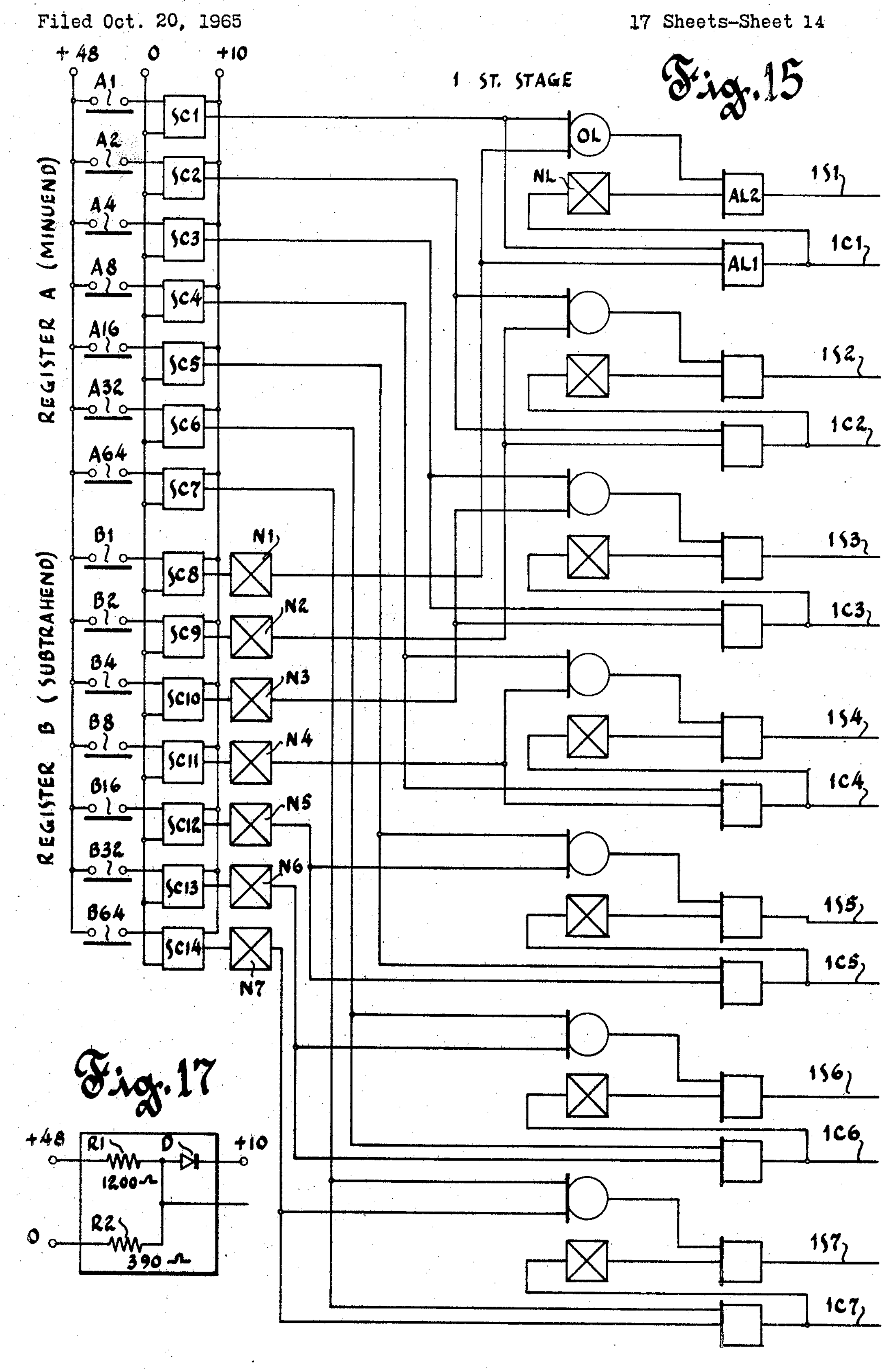
FIGS. 15 and 16 are circuit diagrams showing details of a binary code subtractor shown as a rectangle in the system of FIGS. 3–14.
Figure 18:
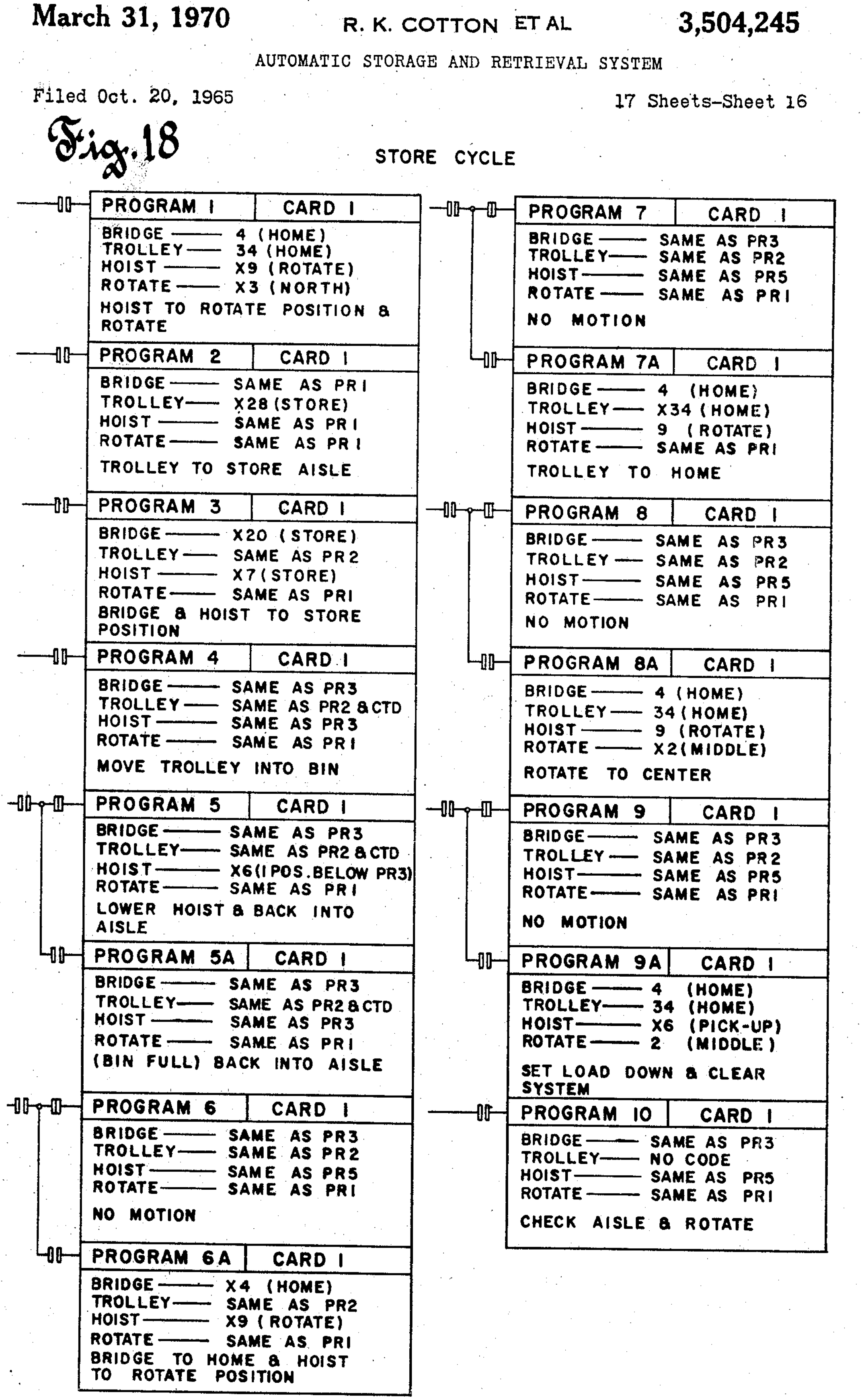

FIG. 17 on sheet 14 shows details of a signal converter used in FIG. 15;

FIGS. 18 and 19 diagrammatically show the sequential operational program steps for the storage and retrieval cycles, respectively, of the system of FIGS. 1–16, including selectable alternate program steps; and FIG. 20 on sheet 6 is a block diagram showing how the circuits of FIGS. 3–14 are assembled.

Figure 1:
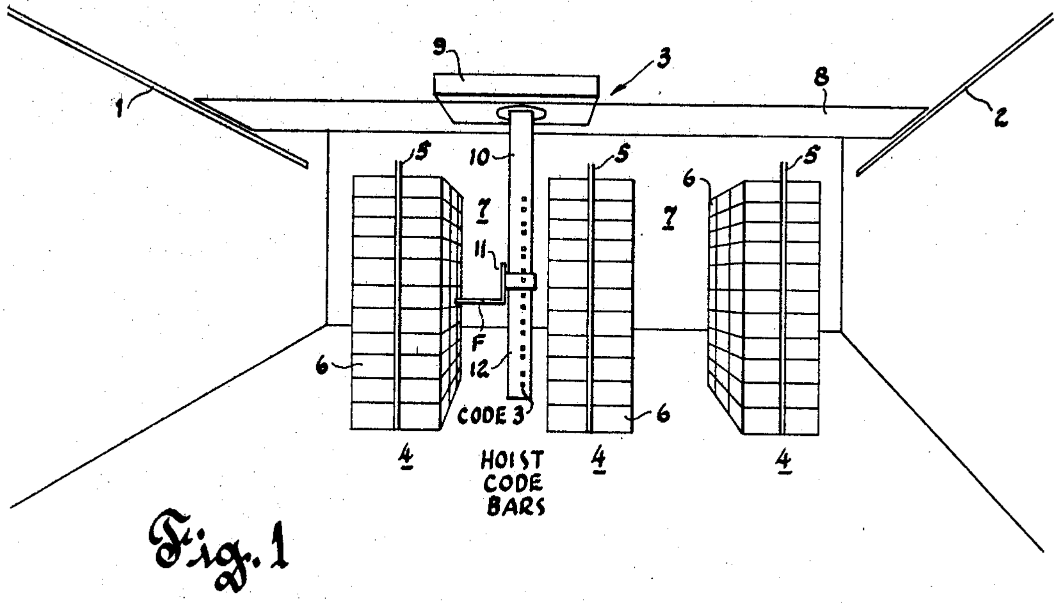
FIGURE 1 is a perspective end view of a warehouse schematically showing three bays of racks or bins and the stacker crane installed therein.

Referring to FIG. 1, the warehouse shown therein comprises a pair of side tracks or bridge rails 1 and 2, one along each side of the warehouse near the top, on which a stacker crane 3 is supported and along which it rolls the length of the warehouse. The bays 4 of racks or bins in which articles are stored stand on the floor of the warehouse. As shown schematically in FIG. 1, each bay 4 comprises a center frame 5 and horizontal rows and vertical columns of bins 6 supported on opposite sides of the center frame so that they are accessible from the long aisles 7 which run between the bays. Alternatively, racks may be used instead of bins which would consist of spaced apart steel beams in rows and columns projecting in cantilever fashion in opposite directions from main frame 5. As will be apparent, such racks could support elongated articles such as metal bar stock including angle irons, rods, etc., in groups or bundles which would span two or more of the steel beams. While only three enlarged bays of storage bins are shown in FIG. 1 for clarity of illustration it will be apparent that a larger number thereof is normally used in a warehouse as shown in the top view of FIG. 2.

As shown in FIG. 1, stacker crane 3 comprises a bridge 8 spanning the warehouse and supported at its opposite ends on side rails 1 and 2. The ends of the bridge are provided with wheels (not shown) driven by an electric motor drive in known manner to afford running of the bridge the length of the warehouse.

The stacker crane also comprises a trolley 9 which is provided with wheels (not shown) driven by an electric motor drive in known manner to afford running of the trolley the length of the bridge across the warehouse. For this purpose, the bridge is provided with suitable rails (not shown) for the trolley to roll along. The trolley is additionally provided with a suitable ring gear structure or the like (not shown) and a rotate motor drive for rotating a mast 10 suspended therefrom.

The stacker crane further comprises a hoist 11 for moving a fork F or other article supporting device up and down along mast 10 so as to position the article opposite any bin in a column thereof. Magnetic code bars 12 are mounted in predetermined spaced apart relation upwardly along mast 10 and have binary codes starting with 3 at the lower end to be read by a hoist proximity reader (hereinafter described and shown in FIG. 5) to control the positioning of the fork relative to the bins or racks in which articles are to be stored, binary codes 2 and 1 being used for slowdown of the hoist.

Figure 2:
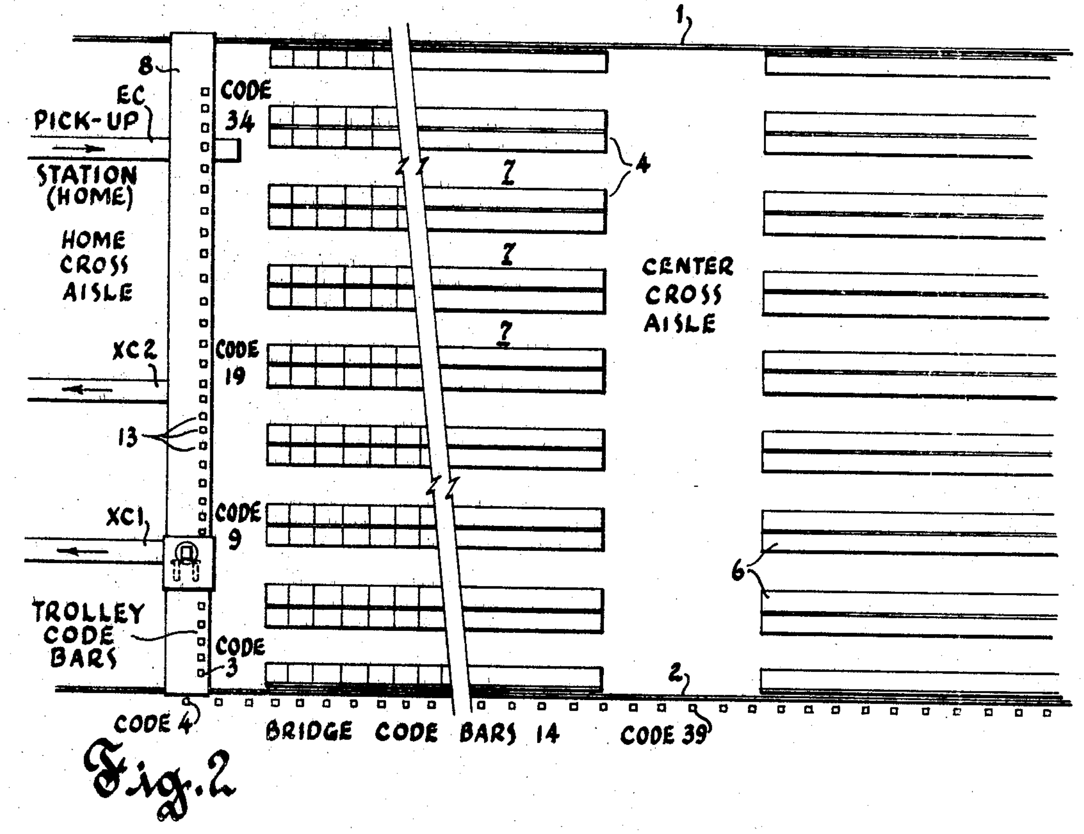
FIG. 2 is a top plan view of an exemplary warehouse schematically showing a multiplicity of rows of racks or bins separated by eight long aisles and two cross aisles and a stacker crane resting in the west-end cross aisle.

A warehouse having a multiplicity of rack bays 4 is shown in FIG. 2, these bays being separated by long aisles 7 and a home or west cross aisle and a center cross aisle, shown in top plan view. In the example of warehouse shown in FIG. 2, there are eight long aisles providing seven full bays with their bins back-to-back and two half bays, there being one such half bay facing each of the first and eighth long aisle with its back against the side wall of the warehouse.

The home cross aisle at the west end of the warehouse is provided for loading and unloading articles onto and from the fork. For this purpose, there are provided an entry conveyor EC leading eastwardly to a pickup station in the home cross aisle and a pair of exit conveyors XC1 and XC2 leading westwardly away from respective set-down stations Nos. 1 and 2 in the home cross aisle. For exemplary purposes, the pickup station has been located at the trolley binary code position having a decimal equivalent of 34 (hereinafter called binary code position 34) and the set-down stations Nos. 1 and 2 have been located at trolley binary code positions 9 and 19, respectively, the trolley positions having binary codes starting with 3 at the south end of the bridge to the north end thereof. The entry conveyor is arranged to move an article directly onto the fork when the latter is positioned slightly below the top of the entry conveyor at hoist binary position 6. In a similar manner, each exit conveyor is arranged to move an article directly off the fork after the latter deposits an article thereon in response to lowering of the hoist to binary code position 6.

The trolley and bridge are also provided with positioning control devices. As shown schematically in FIG. 2, magnetic code bars 13 are mounted in predetermined spaced apart relation along the bridge and have binary codes starting with 3 at the south end to be read by a trolley proximity reader hereinafter described and shown in FIG. 6, binary codes 2 and 1 being used for slowdown. Also, magnetic code bars 14 shown in FIG. 2 are mounted along one bridge track 2 along the path of travel of the bridge and have binary codes starting with 4 at the west aisle to be read by a bridge proximity reader hereinafter described and shown in FIG. 6, binary codes 3, 2 and 1 being used for slowdown. Magnetic code bars 13 and 14 and their associated proximity readers afford control of the positioning of the trolley and bridge, respectively.

The manner in which the system shown in FIGS. 3 to 14 is constructed and the logic and other elements connected to one another will become apparent from the following description of operation thereof, it being understood that certain signal converters and voltage changing logics and amplifiers which merely change the value of a voltage or maintain it constant that would be included in a practical application have been omitted to simplify the disclosure as much as possible.

The operation of the system of FIGS. 3–14 will now be described.

Figure 3:
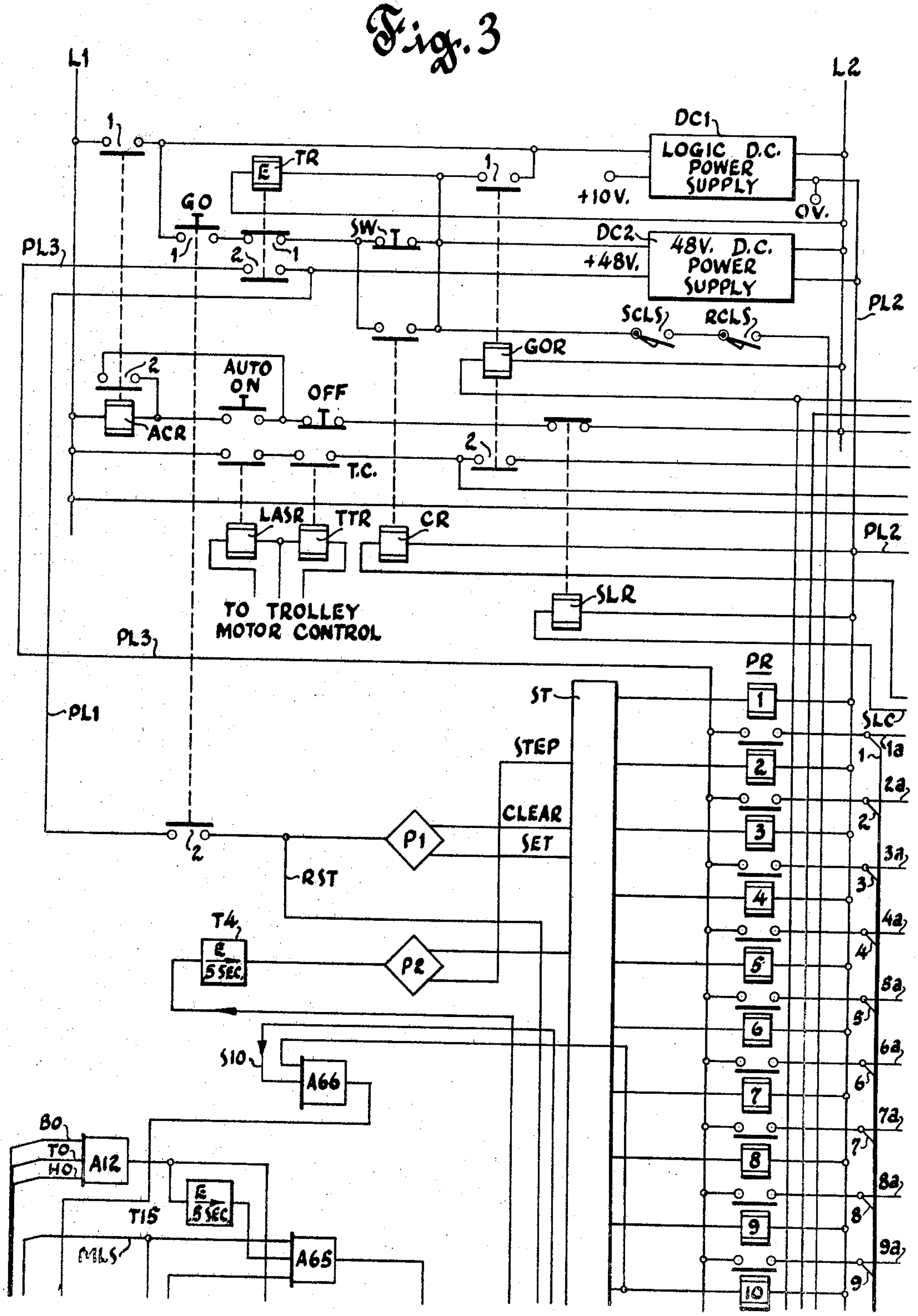
FIGS. 3 through 14 are circuit diagrams schematically showing the automatic storage and retrieval system.

Let it be assumed that single-phase alternating current power is connected to power supply lines L1 and L2 in FIG. 3. Let it also be assumed that three-phase alternating current power is connected to the bridge motor control circuit in FIG. 13, to the trolley motor control circuit of FIG. 13 and to the hoist motor control circuit in FIG. 14 to enable operation of the three-phase alternating current motors therein. Also, it may be assumed that single-phase full-wave rectified power is connected to the rotate motor control circuit in FIG. 10 to enable operation of the direct current shunt-wound motor therein for rotation of the article carrying fork.

At the left-hand portion of FIG. 3, the timed closing contact of a trolley timing relay TTR closes a predetermined time interval after power is applied to the trolley motor through the trolley motor control circuit.

Figure 5:
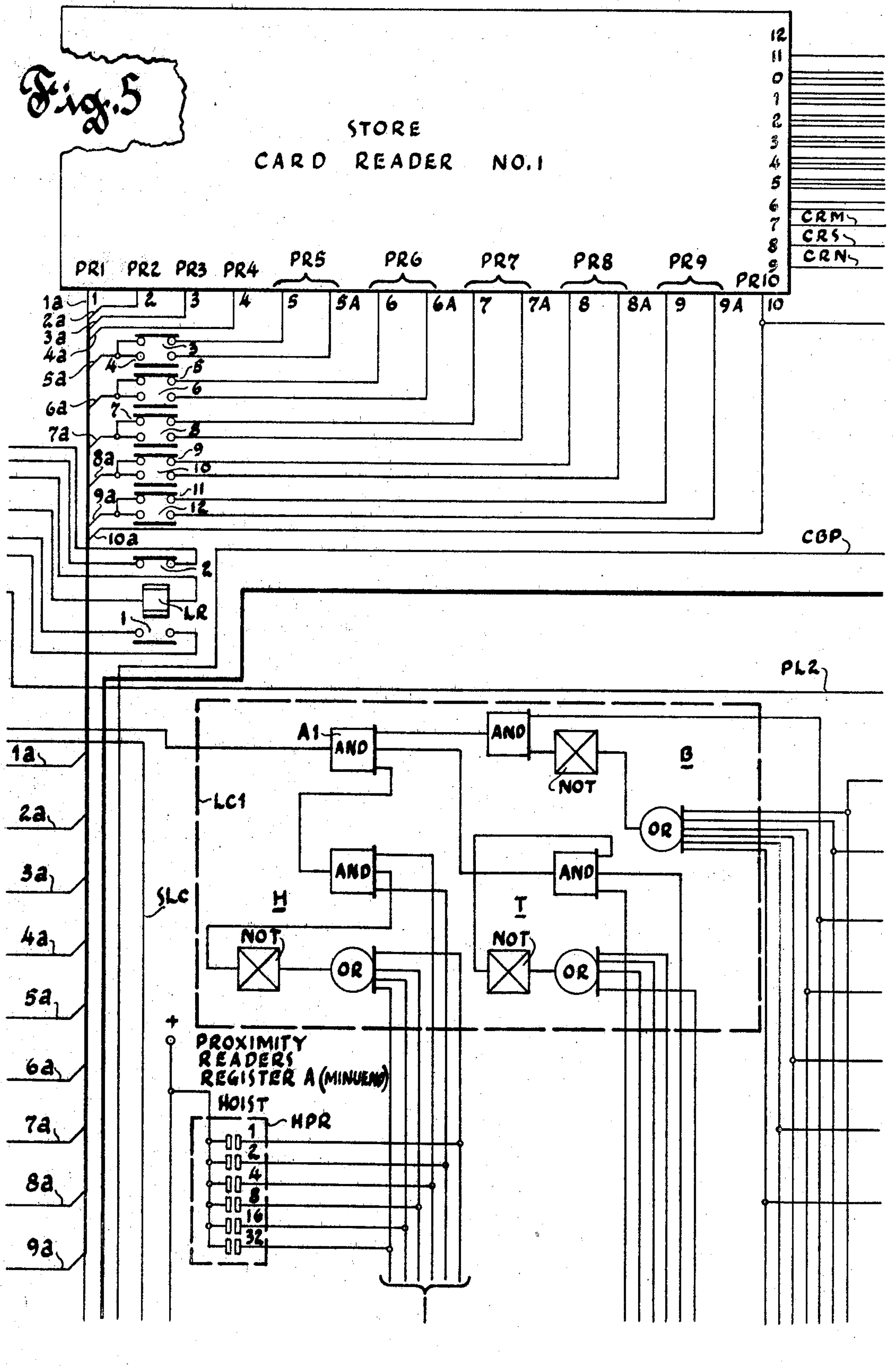

When a punched card is inserted into storage card reader No. 1 in FIG. 5, storage card limit switch SCLS in FIG. 3 closes. Likewise, insertion of a punched card into retrieval card reader No. 2 in FIG. 8 causes closure of retrieval card limit switch RCLS in FIG. 3. As these limit switches are in series connection, it will be apparent that punched cards must be inserted in both card readers to enable operation of the system. The punched card in card reader No. 1 controls movement of the fork from the pickup station at the home position to a predetermined storage bin and back into the aisle. The punched card in card reader No. 2 controls movement of the fork from the aisle at the storage bin to a retrieval bin and then to a set down station and back to the home position. In this manner, the first card reader controls storing of articles and the second card reader controls retrieving of articles so that one article can be stored and another article can be retrieved from storage in each program of operation of the system whereafter the system is automatically cleared. The operator then removes the two punched cards and inserts another pair of punched cards into the card reader and presses the "GO" button to start another storage and retrieval operation. The movements of the fork will hereinafter be described in more detail in connection with a specific example of operation.

To preset the system for automatic operation, the AUTO-ON switch in FIG. 3 is momentarily pressed to energize automatic control relay ACR. In this connection, it may be noted that in actual use the system would also be provided with manual operation controls affording manual control of the movements of the bridge, trolley and hoist and of fork rotation. However, these manual motor controls have not been shown to avoid complicating the drawings.

Energization of relay ACR causes closure of its contact 1 to connect lines L1 and L2 to D.C. power supply circuit DC1 and causes closure of its contact 2 to complete a self-maintaining circuit in shunt of the AUTO-ON switch whereafter the latter may be released to allow it to reopen. The circuit for relay ACR extends also through an OFF switch which may be manually opened to restore the relay and through the normally closed contact of a split and skewed load relay SLR which is used to stop the system in the event of an abnormal condition of the load that is detected by limit switches as hereinafter more fully described.

Connection of circuit DC1 to the alternating current lines as aforesaid causes direct voltage of positive ten volts or the like to appear at its left-hand output terminal and zero volts at its right-hand terminal for supplying logic circuits at a multiplicity of points in the system as hereinafter described.

The system is now ready for operation by pressing the GO button. Contact 1 of the GO pushbutton switch connects D.C. power supply circuit DC2 across lines L1 and L2 in a circuit extending also through contact 1 of relay ACR, contact 1 of relay TR and switch SW. Connection of circuit DC2 to the alternating current lines causes suitable value of direct voltage of positive 48 volts or the like to be applied to power line PL1 and to other points in the system and zero volts to power line PL2, the zero voltage terminal of circuit DC1 being also connected to power line PL2. Contact 2 of switch GO applies the positive voltage from power line PL1 through signal converting means (not shown) to pulser P1 whereby instantly to clear stepper ST and to set it to its first step to energize program relay PR1 as hereinafter more fully described. For an illustration and description of stepper of this type, reference may be had to FIGS. 4*b* and 7 of R. R. Hedrick et al. copending application Ser. No. 349,946, filed Mar. 6, 1964, now Patent No. 3,320,593, issued May 16, 1967, which shows how a plurality of five-step steppers can be connected together to obtain the desired number of steps.

The aforesaid positive voltage applied from power line PL1 causes the input of pulser P1 to go from zero to plus 10 volts. This positive voltage signal operates pulser P1 to provide a clear pulse and a set pulse to stepper ST. That is, activation of the pulser causes it to provide a 30 microsecond negative pulse from its upper output terminal to the clear input terminal of the stepper to cause the latter to be reset to a no-output condition. At the end of the clear pulse, pulser P1 provides a 5 microsecond set pulse from its lower output terminal to the set input terminal of the stepper to set the stepper to its first step condition. In this condition, the stepper applies a positive voltage from its first output terminal through a suitable power AND unit (not shown) to energize program relay PR1. For an illustration and description of a pulser of this type, reference may be had to P. M. Kintner copending application Ser. No. 288,829, filed June 18, 1963, now Patent No. 3,230,394, issued Jan. 18, 1966.

The aforementioned depressing of pushbutton switch

Figure 4:
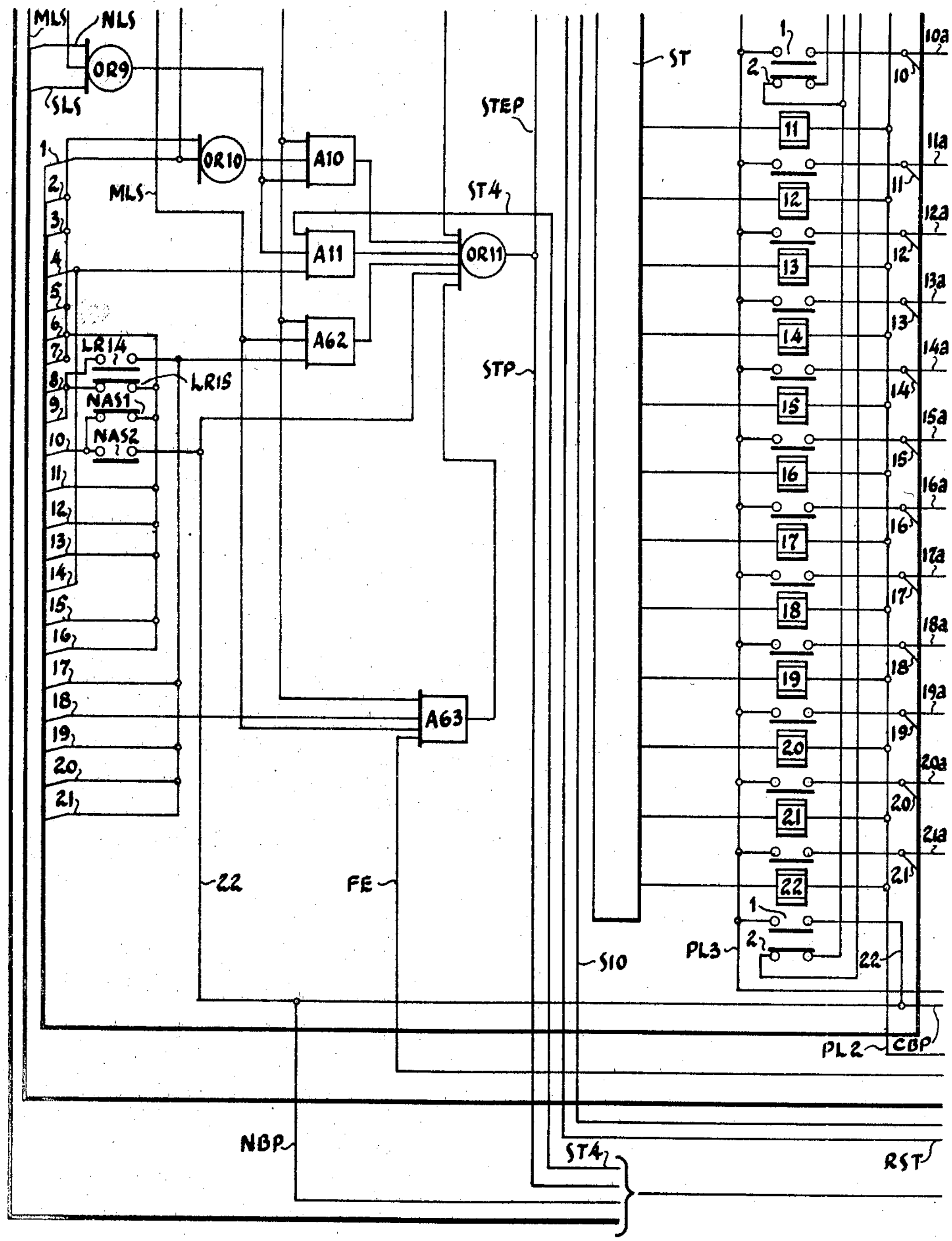

GO also causes energization of relay GOR in parallel with power supply circuit DC2 in a circuit extending also through limit switches SCLS and RCLS, contact 2 of program relay PR22 in FIG. 4 and then in parallel through contact 2 of program relay PR10 in FIG. 4 and contact 2 of relay LR in FIG. 5, and the operating coil of relay GOR to line L2. For this purpose, contacts 2 of program relays PR10 and PR22 are closed since only program relay PR1 is energized and all the other program relays are deenergized. Relay LR is also deenergized since it energizes only in response to detection of a full bin as hereinafter more fully described.

Upon energization as aforesaid, relay GOR closes its contact 1 to complete a maintaining circuit for itself and for power supply circuit DC2 in shunt of contact 1 of switch GO and contact 1 of timing relay TR and switch SW. Relay GOR also closes its contact 2 to prepare an operating circuit for relay LR and to place the latter under the control of trolley load amps sensing relay LASR for full bin detection purposes hereinafter described.

The aforesaid depressing of pushbutton switch GO also causes energization of timing relay TR in parallel with circuit DC2 and relay GOR. Relay TR is a timing relay which times after energization as indicated by the E thereon. After a predetermined time interval, relay TR opens its contact 1 to interrupt the original energizing circuits and to place the system under the maintaining control of relay GOR. Relay TR also closes its contact 2 after a predetermined time interval to connect positive D.C. voltage to power line PL3. This connection of positive voltage to power line PL3 enables operation of the card readers and the remainder of the system to start movement of an article from the loading station to one of the storage bins.

At this point it may be observed that relay CR may be rendered effective or ineffective as desired. The purpose of this relay is to prevent starting of automatic operation unless the bridge and trolley and hoist are at their respective home positions. That is, the bridge must be at position 4, the trolley must be at position 34 and the hoist must be at position 6 before relay CR can be energized, these being the respective home or normal starting positions of the three devices. Relay CR may be rendered effective by opening switch SW to unshunt its contact and can be rendered ineffective by leaving switch SW closed to shunt its contact. Relay CR is controlled by a logic system LC1 shown in FIG. 5 and having three logic portions B, T and H and an output circuit for operating relay CR. Logic portions B, T and H, each having an OR, a NOT and an AND logic, are connected to the respective proximity readers of the bridge, trolley and hoist so that they are capable of recognizing only binary numbers 4, 34 and 6, respectively, indicative of their home positions. That is, bridge logic portion B provides a positive output voltage signal only in response to a binary 4 input thereto. Trolley logic portion T provides a positive output voltage signal only in response to a binary 34 input thereto. And hoist logic portion H provides a positive output voltage signal only on response to a binary 6 input thereto. The output circuit of logic system LC1 comprises an AND logic circuit A1 which provides a positive output voltage only in response to three simultaneous positive voltage inputs. Thus, the three positive voltage outputs of the bridge, trolley and hoist logic portions are applied to AND logic A1 to cause the latter to operate relay CR through an amplifying power AND unit (not shown). When any other set of numbers is read by the proximity readers, relay CR does not energize and therefore can be used to restrict initiation of automatic operation only to the home position. To enable automatic operation when relay CR is effective, it is necessary to bring the bridge, trolley and hoist to their home positions under manual control.

For an example of how the system operates to store an article and to retrieve an article, let it be assumed that the bridge, trolley and hoist are initially at their home positions and that the fork is initially at its home rotary position. The home position of the bridge is at the west end of the warehouse at the first cross aisle. Since the smallest binary number used is four, the binary numbers smaller than that being used for slowdown signals, this home position of the bridge will correspond to the binary code having a decimal equivalent of 4 at the first bridge code bar as shown in FIG. 2. The home position of the trolley is at the pickup station in the west cross aisle at which point the articles are picked up by the fork. This pickup station for the trolley is at the 32nd trolley code bar corresponding to binary code 34 as shown in FIG. 2 since the smallest binary number used is three, binary codes smaller than that being used for slowdown signals. The home position of the hoist is at the fourth hoist code bar corresponding to binary code 6 since the smallest binary number used is three, the smaller binary codes 2 and 1 being used for slowdown signals. The fork rotary home position is at the middle or facing west as distinguished from south and north positions, that is, the fork is arranged to be rotated from south to middle (west) to north and return from north to west to south.

Figure 6:
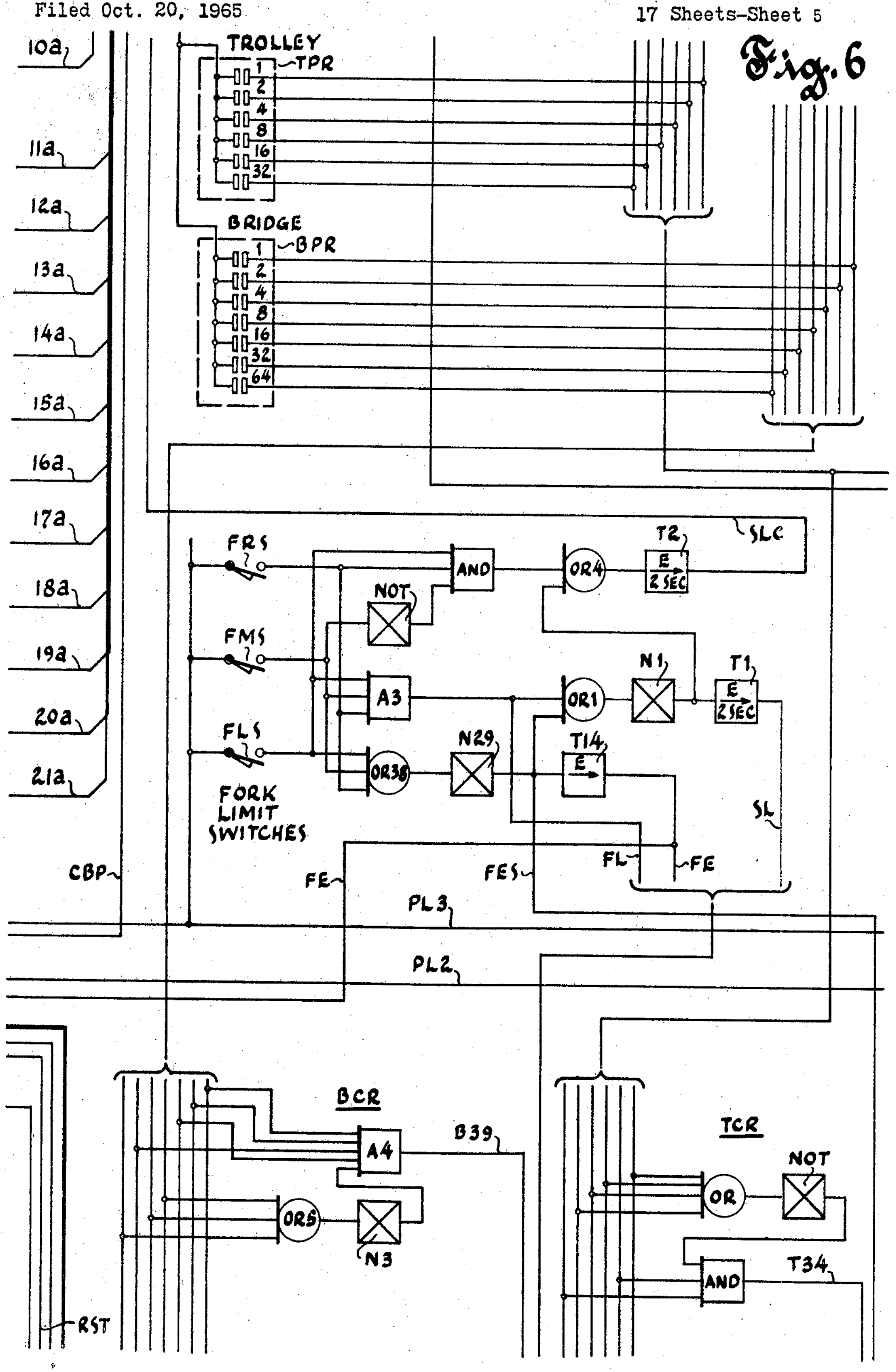

In the aforementioned home positions bridge proximity reader BPR in FIG. 6 reads binary code 4 by closing the third contact from the top, trolley proximity reader TPR in FIG. 6 reads binary code 34 by closing the second and last (sixth) contacts from the top, and hoist proximity reader HPR in FIG. 5 reads binary code 6 by closing the second and third contacts from the top. In this manner, positive voltage is applied to the third conductor of the bridge group of seven conductors, to the second and last conductors of the trolley group of six conductors and to the second and third conductors of the hoist group of six conductors and zero voltage appears on the other conductors.

These positive voltages and zero voltages are applied to logic system LC1 to provide a positive voltage output therefrom for energization of relay CR as hereinbefore described.

Figure 9:
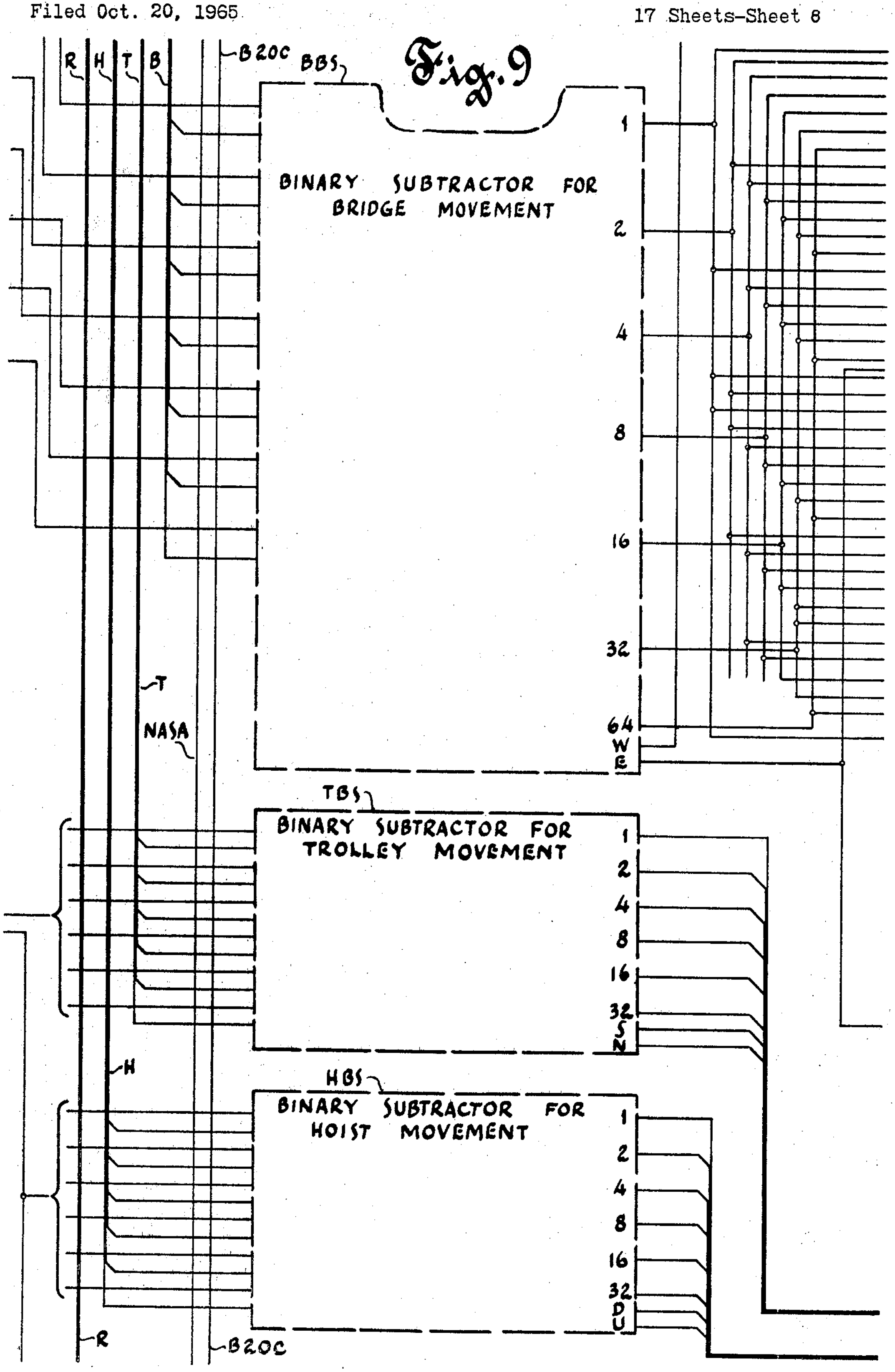

These positive voltages indicative of the home position binary codes of the bridge, trolley and hoist are also applied to bridge binary subtractor BBS, trolley binary subtractor TBS and hoist binary subtractor HBS, respectively, in FIG. 9 at first sets of input conductors thereof. The remaining conductors of each of the three first sets have zero voltage applied thereto. These binary codes applied to the binary subtractors constitute the minuends from which the card reader binary codes or subtrahends are subtracted, respectively.

Figure 10:
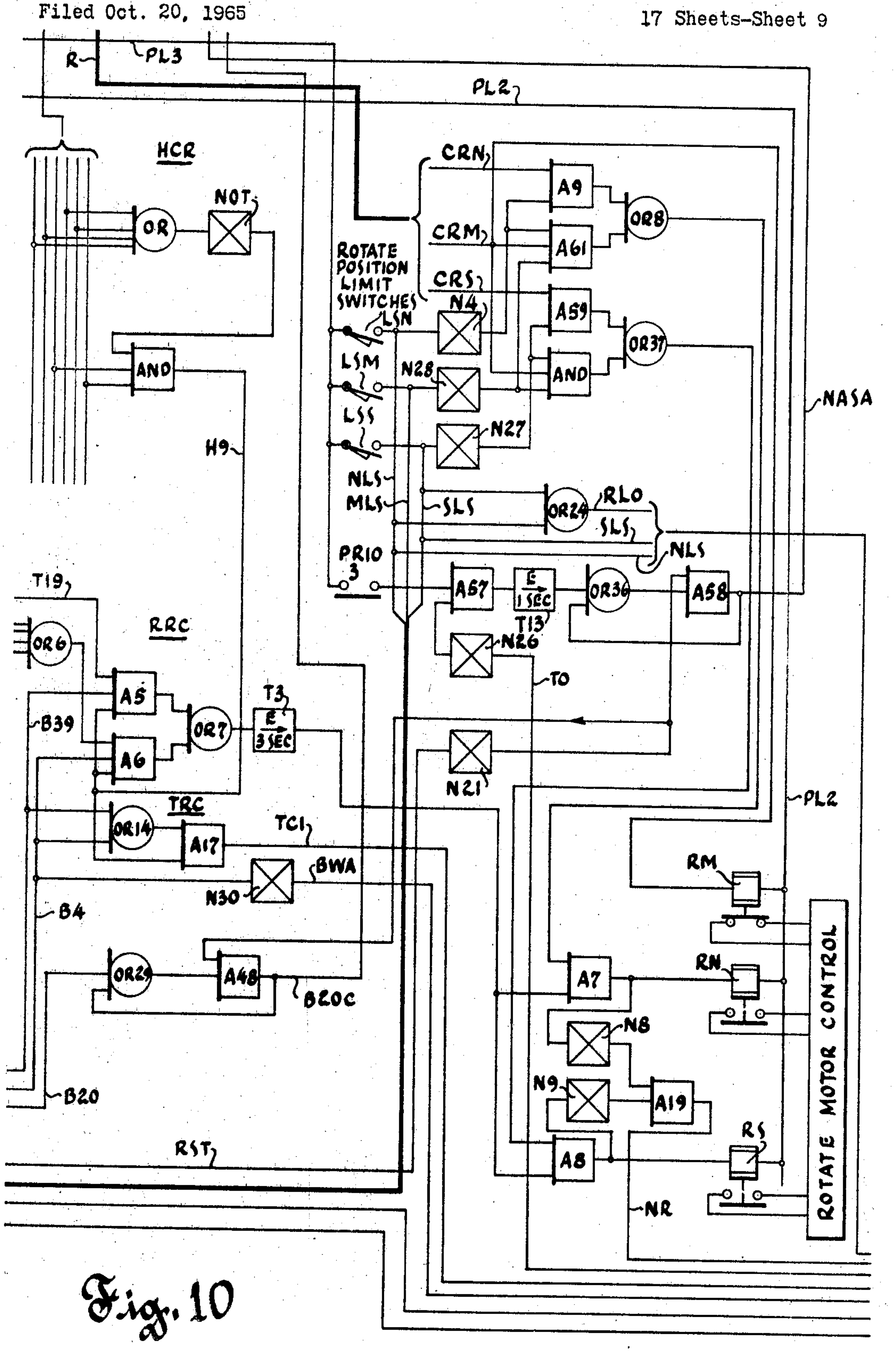

The fork in its home position is indicated by middle limit switch LSM of the rotate position limit switches in FIG. 10 being closed. This causes a positive voltage to be applied through conductor MLS and the cable through which this conductor runs to the stepper control logic circuit in FIGS. 3 and 4 to indicate that the fork is in its middle or westwardly directed position for reasons hereinafter described.

The fork must be in its middle position to receive an article. This article, which may be a bundle of metal rods twenty-five feet long, is brought in by entry conveyor EC and stopped in a position above the fork so that when the fork is hoisted a predetermined amount, it will pick up the article from the conveyor. Since the article must be turned 90 degrees so that it will fit for conveyance along a west-east aisle, the article is preferably first hoisted above head level so that it can be turned without injuring personnel. For exemplary purposes, the rotate position corresponds to binary code 9. Therefore, the initial part of the program consists of hoisting from binary code 6 to binary code 9 and then rotating the fork 90 degrees as hereinafter more fully described.

To show how the system operates through a cycle and automatically clears the system, it will be assumed that an article is to be picked up at the pickup station which is trolley position 34 and moved to and deposited in a storing position corresponding to the following binary codes:

| | |
|---|---|
| Bridge | 20 |
| Trolley | 28 |
| Hoist | 7 |
| Rotate | North |

At this point, it may be noted that card reader No. 1 which controls storing of articles reads three columns of the punched card at a time under the control of stepper ST. That is, when the stepper is at its first step, positive voltage is applied to columns 1, 2 and 3 of the card reader by program relay PR1 so that if there are any holes in columns 1, 2 and 3 of the punched card, these holes will be indicated in the card reader output. Similarly, when the stepper steps to position 2, the next three columns 4, 5 and 6 will be read in a similar manner under the control of the second program relay PR2, etc., to relay PR21.

In the card reader, a contact is closed for each hole in the card in the three columns being read when a pin passes through the hole in the card. Every set of three columns is identical in the card reader although the codes punched on the successive sets of three columns of the card differ. In card reader No. 1, 45 columns or 15 sets of three columns are used. In card reader No. 2, 57 columns or 19 sets of three columns are used. In each set of three columns the first column contains the bypass signal in row 11 and the seven bit bridge binary code in rows 0, 1, 2, 3, 4, 5 and 6; the second column contains the six bit trolley binary code in rows 0, 1, 2, 3, 4 and 5 and the side motion command signal in row 9; and the third column contains the six bit hoist binary code in rows 0, 1, 2, 3, 4 and 5 and the three bit rotate code in rows 6, 7 and 8. Therefore, all of the above information can be read simultaneously from the three columns if it is punched on the card or so much of it is read as is punched on the card.

In a typical crane storing cycle, the following functions are performed at the respective steps of the program stepper as shown in FIG. 18:

(1) Hoist the article to rotate position 9 and rotate to north.

(2) Move trolley to store aisle at code 28.

(3) Move bridge to store position 20 and move hoist to store position 7.

(4) Move trolley into bin.

(5) Lower fork and back into aisle. LR: bin full, back into aisle.

(6) No motion; stepper to step 7. LR: Bridge to home and hoist to rotate position 9.

(7) No motion; stepper to step 8. LR: Trolley to home.

(8) No motion; stepper to step 9. LR: Rotate to west.

(9) No motion; stepper to step 10. LR: set load down and clear system.

(10) Check the retrieve code aisle and rotate positions.

The remaining steps of the program shown in FIG. 19 are used to retrieve an article from storage as hereinafter described following description of the storing operation.

Going back to the first step of the storing cycle, it will be seen that in order to pick up the article and to arrange it for movement down an aisle, the hoist motor control will be operated to raise the fork from home position 6 to rotate position 9 and the rotate motor control will be operated to rotate the fork from west to north. For this purpose, card reader No. 1 in FIG. 5 reads hoist binary code 9 and rotate code CRN for rotate north. To this end, energization of program relay PR1 as aforesaid causes closure of its contact in FIG. 3 to apply positive voltage through conductor 1*a* to the first set of three columns of the card reader in FIG. 5. The proper contacts are closed through the holes in the punched card to pass this voltage through hoist (H) conductors in rows 0 and 3 in FIG. 8, corresponding to binary bits 1 and 8, to hoist binary subtractor HBS in FIG. 9. At the same time, hoist proximity reader HPR in FIG. 5 senses the home position 6 of the hoist and sends positive voltages on the second and third conductors to hoist binary subtractor HBS in FIG. 9. The card reader binary number 9 is subtracted from the proximity reader binary number 6 in the hoist binary subtractor to obtain the difference binary number 3 and also to obtain a directional signal to indicate which way the hoist should move, up or down. A positive voltage on the D output conductor of the hoist binary subtractor will cause the hoist to move down whereas a positive voltage on the U output conductor will cause the hoist to move up.

In the above example, the hoist binary subtractor will provide an output consisting of a binary code 3 indicated by positive voltage on output conductors 1 and 2 and an "up" directional signal indicated by a positive voltage on output conductor U. This binary code 3 and "up" directional signal are applied to the hoist direction and slowdown circuit HDS in FIG. 12. This hoist direction and slowdown circuit has been shown schematically because it is like the trolley direction and slowdown circuit TDS except for the portion thereof shown in a broken line rectangle wherein it differs. The details thereof will be described in connection with the trolley direction and slowdown circuit. For present purposes, it may be observed that although the hoist binary subtractor will indicate binary number differences up to a decimal value of 63, the hoist direction and slowdown circuit recognizes only values of 2, 1 and 0 for slowdown and stop purposes. For any higher values, the directional signal will cause the hoist to run at base speed. Accordingly, the hoist direction and slowdown circuit does not recognize the binary number 3 but does respond to the "up" signal to provide a positive voltage at hoist up output conductor HU.

This positive voltage on hoist up conductor HU will energize hoist up relay HUR provided that a split or skewed load signal is not present. This positive voltage on conductor HU is applied to one of the two input terminals of AND logic A2 in FIG. 14. If the load is not split or skewed as it rests on the fork, positive voltage will appear on the other input terminal also of AND logic A2 to effect a positive voltage output through an amplifier (not shown) to energize hoist up relay HUR. This causes closure of the relay contact to operate the hoist motor control in a manner to raise the article.

A split or skewed load is detected by fork limit switches FRS, FMS and FLS in FIG. 6. When the conveyor moves an article onto the fork at the pickup station, all three limit switches should close to indicate that the load is properly positioned. If the load is split, middle limit switch FMS remains open. If the load is skewed to the right, left limit switch FSL remains open and if the load is skewed in the other direction, right limit switch FRS remains open. If one of the limit switches remains open, only two out of three positive voltage inputs will be applied to AND logic A3 to cause a zero voltage output therefrom. This zero voltage causes a zero voltage output from logic OR1 which is inverted to positive voltage in NOT logic N1 and applied to timer T1. The purpose of this timer is to delay the output signal for two seconds to allow all the switches to close. After such time interval, timer T1 applies a positive voltage through conductor SL and OR logics OR2 and OR3 to NOT logic N2 in FIG. 13. This NOT logic inverts this positive voltage to zero volts which is applied to AND logic A2 in FIG. 14 to prevent energization of hoist up relay HUR. Thus, the hoist will not operate in the event of a split or skewed load. The load must be positioned correctly on the fork to allow operation of the hoist.

Referring again to FIG. 6, it will be seen that the positive voltage split or skewed load signal is applied from NOT logic N1 also through logic OR4 to timer T2. The purpose of this timer is to delay the operation of relay SLR for two seconds to allow time for all the switches to close and to prevent operation of the relay due to transient conditions or the like. After the time interval, timer T2 applies a positive voltage through a power AND unit (not shown) and conductor SLC to energize relay SLR in FIG. 3 which opens its contact to restore automatic control relay ACR. It will be apparent that deenergization of the automatic control relay stops operation of the system and restores it to its original condition.

Assuming that an abnormal condition such as a split or skewed load does not exist, the hoist continues operating to raise the article from position 6 toward position 9. The hoist runs at its normal base speed until a difference of two is detected whereupon slowdown action is applied. When the hoist proximity reader reads the binary code 7 from the next code bar, hoist binary subtractor HBS will provide an output corresponding to binary code 2. This difference code is recognized by the hoist direction and slowdown circuit in FIG. 12 as hereinafter described which provides a positive voltage signal on its output conductor HS. This positive voltage is applied from hoist slowdown conductor HS through a power AND unit (not shown) to energize hoist slowdown relay HSR. This relay closes its contact to cause the hoist motor control circuit to reduce the hoist speed to a predetermined low value. The hoist proximity reader next reads the binary code 8 from the next code bar to get a difference of 1. This difference of 1 is also recognized by the hoist direction and slowdown circuit as a slowdown signal as hereinafter described so that relay HSR maintains slowdown action. This causes the hoist speed to be decreased to a slow enough value so that by the time a zero difference is detected, the hoist motor can be stopped.

The hoist moves at this slow speed until zero difference is detected between the hoist proximity reader binary code and the card reader binary code. This causes the positive voltage to be removed from output conductor HU of the hoist direction and slowdown circuit as hereinafter described to deenergize hoist up relay HUR. This causes the hoist motor control circuit to deenergize the hoist motor and to apply the brake whereby to hold the article at the intended binary position 9 which is high enough that the article can be safely turned for entry into an aisle.

The next operation to be performed is rotation of the article. The system is provided with means for restricting rotation to certain positions of the bridge, trolley and hoist.

Rotation of the article is restricted to the west aisle and center aisle positions of the bridge, to the pickup station and two set down stations of the trolley and to position 9 of the hoist. That is, to allow rotation, the bridge must be either in its home aisle or in the center aisle indicated by binary codes 4 and 39, respectively, the trolley must be at the pickup station indicated by binary code 34 or at one of the set down stations indicated by binary codes 9 and 19, and the hoist must be at binary code 9 position. For this purpose, the system is provided with means which allows rotation only when it recognizes a combination of three of these binary numbers.

Figure 7:
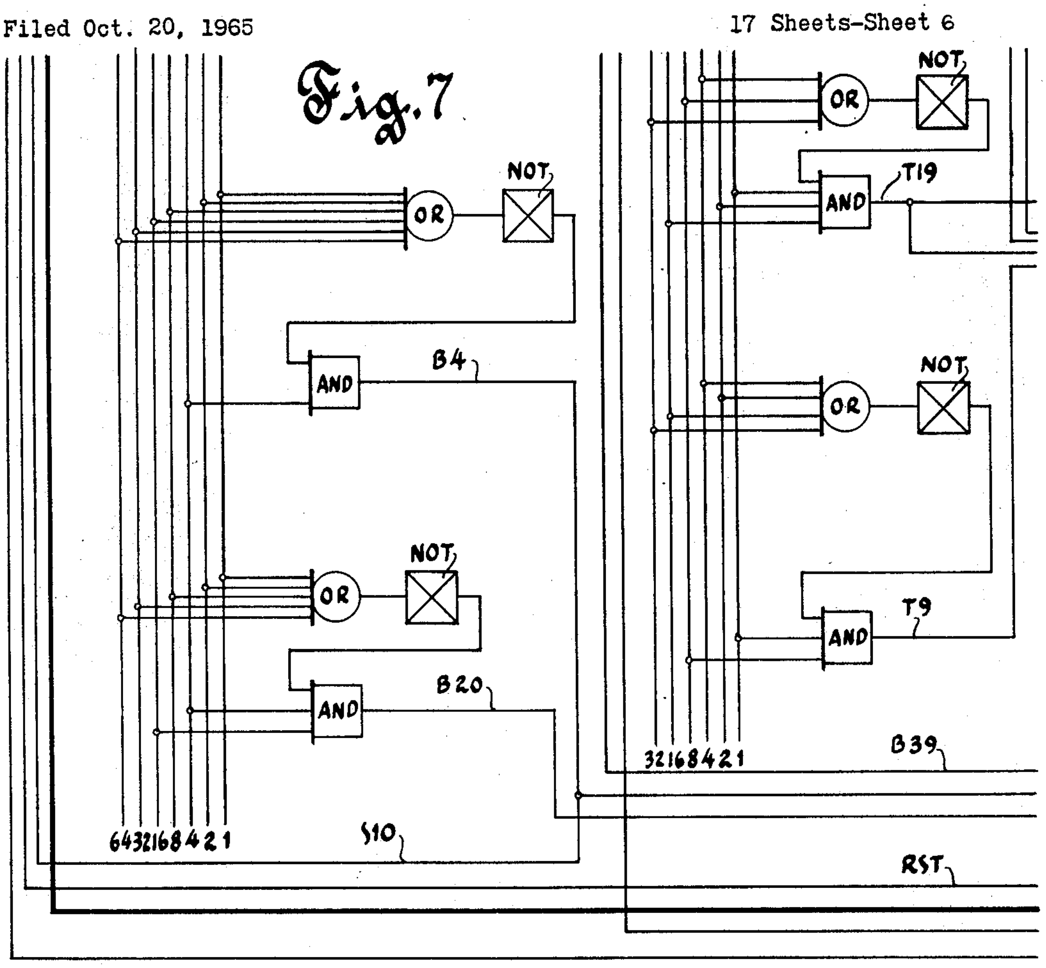

These code recognition logic circuits are shown in FIGS. 6, 7 and 10. The seven binary bit conductors from the bridge proximity reader are connected to bridge code recognition circuit BCR. The six binary bit conductors from the trolley proximity reader are connected to trolley code recognition circuit TCR. And the six binary bit conductors from the hoist proximity reader are connected to hoist code recognition circuit HCR.

Bridge code recognition circuit BCR is provided at the top thereof with an AND logic A4, an OR logic OR5 and a NOT logic N3 connected so that an output is obtained only in response to a binary code 39. This binary code 39 is indicated by positive voltage on conductors 1, 2, 4 and 32 and zero voltage on the other three conductors 8, 16 and 64. Since AND logic A4 is connected to conductors 1, 2, 4 and 32, it will recognize only binary code 39. Logic OR5 is connected to conductors 8, 16 and 64 so that it will recognize only zero voltage thereon. Under such condition, the zero voltage from logic OR5 is inverted in logic N3 to apply a positive voltage to the lower input of logic A4. Thus, logic A4 applies a positive voltage to conductor B39 only when the bridge proximity reader is reading binary code 39.

In a similar manner, the midportion of circuit BCR comprising the OR logic, a NOT logic and an AND logic is arranged to provide a positive voltage on conductor B4 only when the bridge proximity reader is reading binary code 4. Thus, bridge code recognition circuit BCR will recognize only binary numbers 4 and 39 and the bridge must be in either cross aisle to allow rotation of the fork.

The lower portion of circuit BCR comprising the OR logic, NOT logic and the AND logic serves a different purpose. This portion of the circuit recognizes only binary code 20 to provide positive voltage on conductor B20. This portion of the circuit restricts bridge movement to the nearest cross aisle for rotation of the fork. That is, for bridge binary codes from 4 to 19, the bridge will move to the west cross aisle for turn around purposes. But after the bridge has reached binary code 20 or above, it will move to the middle aisle for turn around purposes as hereinafter more fully described.

In a similar manner, trolley code recognition circuit TCR in FIGS. 6 and 7 is provided at the top with an OR logic, NOT logic and an AND logic arranged to recognize only trolley binary code 34 to provide a positive voltage on conductor T34. At the center of circuit TCR, the OR logic, NOT logic and an AND logic are arranged to recognize only trolley binary code 19 and to provide a positive voltage on conductor T19. And the OR logic, NOT logic and an AND logic at the bottom portion of circuit TCR are arranged to recognize only trolley binary code 9 and to provide a positive voltage on conductor T9 in response thereto. As shown in FIGS. 6 and 7, these three parts of circuit TCR are connected to the six binary bit conductors of trolley proximity reader TPR.

Hoist code recognition circuit HCR in FIG. 10 is similarly provided with an OR logic, a NOT logic and an AND logic connected to the six binary bit conductors of hoist proximity reader HPR and arranged to recognize only hoist binary code 9 to provide a positive voltage on conductor H9.

The three output conductors T34, T19 and T9 of circuit TCR are connected to inputs of logic OR6 in FIG. 10 so that if the trolley is in any of these three positions, a positive voltage is applied therefrom. This positive voltage causes rotate restriction circuit RRC in FIG. 10 to permit rotation provided the other required conditions are present. Alternatively, a fork empty signal through conductor FES can be applied to the fourth input of logic OR6 to permit rotation of the empty fork regardless of trolley position provided the other required conditions are present.

An AND logic A5 is provided in FIG. 10 for receiving positive voltages at its three inputs from trolley code recognition conductor T19, bridge code recognition conductor B39 and from hoist code recognition conductor H9 to provide a rotate permissive signal when these three conditions exist. AND logic A6 receives positive voltages at its three inputs from logic OR6 indicating empty fork or trolley in position 9, 19 or 34, from bridge code recognition conductor B4 and from hoist code recognition conductor H9. Therefore, a positive voltage output from either logic A5 or A6 permits rotation to take place. This voltage is applied through logic OR7 to a three second timer T3 which provides a short delay before rotation can actually start. The rotate permissive signal is applied from timer T3 to the lower inputs of AND logics A7 and A8 in the rotate control circuit to permit rotation in combination with a command signal from the card reader as hereinafter described.

Since it was heretofore assumed that the fork will be rotated from the west or middle position where it picked up the load to its north position, it will be apparent that card reader No. 1 sends a positive voltage signal along conductor CRN as a command signal to the rotate control logic circuit in FIG. 10. Since the fork is in its middle position prior to rotation, of the rotate position limit switches middle position limit switch LSM is closed and north and south position limit switches LSN and LSS are open. Consequently, zero voltage input to NOT logic N4 is inverted to a positive voltage and applied to AND logic A9 to enable the latter to pass the rotate control command signal coming over conductor CRN. In situations such as this where there is an open switch such as a limit switch and a zero voltage is required for inversion to a positive voltage, the zero voltage is actually obtained from a signal converter of a well known resistance type shown in FIG. 17, sheet 15, connected between switch LSN and the junction of conductor NLS.

The gating signal from the limit switch and the command signal cause a positive voltage output from AND logic A9 which is applied through logic OR8 to one of the two inputs of AND logic A7. This AND logic A7 is used to receive the permissive signal to allow rotation only if the bridge, trolley and hoist are in one of the positions heretofore described.

Assuming that the bridge, trolley and hoist are in positions hereinbefore described, a permissive rotate signal is applied from timer T3 to the other input of AND logic A7 allowing the rotate command signal to pass therethrough and through a power AND unit (not shown) to energize rotate-north relay RN. This relay closes its contact to operate the rotate motor control circuit causing rotation of the fork and the article thereon in the clockwise direction. Limit switch LSM opens when the fork leaves its middle position and when it reaches its north position, limit switch LSN closes to stop the rotation. The purpose of timer T3 is to provide a 3 second delay after the load is hoisted to binary position 9 before rotation is started.

Limit switch LSN stops the rotation by deenergizing relay RN. To this end, the positive voltage applied through limit switch LSN is inverted to zero voltage in NOT logic N4 which terminates the positive voltage output of AND logic A9. This causes relay RN to deenergize and reopen its contact whereby the rotate motor control stops the rotary action and applies the brake to hold the fork in the north position.

The first step of the program cycle has now been completed, that is, the article has been hoisted to binary position 9 and has been rotated to a position wherein it can be passed along an aisle. It is now time to step the stepper to the second step in order to extract the information from the second group of three columns (4–6) of the punched card, and to operate the system in accordance therewith.

The stepping signal is conveniently applied by limit switch LSN which also stopped the rotation of the fork. This limit switch applies a positive voltage through conductor NLS to an input terminal of logic OR9 in FIG. 4 which in turn applies a positive voltage to one of the three inputs of each of AND logics A10 and A11.

Logic A10 requires a coincidence of two other inputs in order to pass the stepping signal. One of these inputs is obtained from AND logic A12 in FIG. 3. If the bridge, trolley and hoist are stopped in the positions called for by the punched card, their direction and slowdown circuits in FIGS. 11 and 12 will provide positive voltage "stopped" signals on conductors B0, T0 and H0, respectively. The manner in which these stopped signals are obtained will be hereinafter more fully described. For present purposes, it may be observed that since the bridge is in the west cross-aisle, the card will call for binary code 4 and since the trolley is in the pickup position, the punched card will call for binary code 34. Also, the hoist is in binary code position 9 called for by the punched card. Consequently, zero outputs will be obtained from the three binary subtractors along with east, south and up directional signals to provide the positive voltages on conductors B0, T0 and H0. These three voltages will cause AND logic A12 in FIG. 3 to apply a positive voltage to the upper input of logic A10 in FIG. 4. The third input to AND logic A10 is obtained from the program relay. Thus, relay PR1 applies a positive voltage through its closed contact from power line PL3 to and through program conductor 1 to logic OR10. The output of the latter is applied to the third input of AND logic A10. As a result, logic A10 applies a positive voltage through logic OR11 to timer T4 in FIG. 3. This timer delays the signal a half of a second and then applies a positive voltage to pulser P2.

Pulser P2 applies a stepping pulse to the stepper to step it to its second position. Only the short pulse of the pulser is used and applied from its lower output terminal to the step terminal of the stepper. The upper, long pulse output terminal of pulser P2 is shown as connected to stepper ST also and may be assumed to be connected through a dummy load such as a resistor therein to a positive voltage source which is necessary when only the short pulse is used. When the stepper steps to position 2, relay PR1 restores and relay PR2 energizes and closes its contact. As a result, positive voltage is applied through this contact and conductor 2 to logic OR10 in FIG. 4 to prepare for the next stepping operation. Positive voltage is also applied through this contact and conductor **2*a* to the second set of three columns of card reader No. 1 to extract the information being read from columns 4, 5 and 6** of the punched card.

The next thing to be done is to move the trolley to the store aisle. For this purpose, card reader No. 1 will read the following binary codes from columns 4–6 of the card—

Step 2:

| | |
|---|---|
| Bridge | **4** (same) |
| Trolley | **28** |
| Hoist | **9** (same) |
| Rotate | North (same) |

As will be apparent from the above codes, only the trolley code is different from the previous binary code 34 whereas the bridge, hoist and rotate positions remain unchanged for the second step of the program cycle.

Since the card reader binary code is always subtracted from the proximity reader binary code, the trolley binary subtractor will provide a difference binary code of 6 and a positive directional signal indicating that the trolley must move south to code position 28. This will be indicated by positive voltage on trolley binary subtractor output conductors 2, 4, and S.

The voltage on conductor S will start the trolley moving in the southerly direction. For this purpose, positive voltage is applied in FIG. 12 from conductor S through logic OR12 to one of the three inputs of AND logic A13 which, however, will not pass the trolley directional signal unless certain other conditions exist. One of these conditions which must coincide with the south directional signal is that there must not be a north directional signal. Thus, zero voltage at the north output N of the trolley binary subtractor is applied through logic OR13 to AND logic A14. The output of the later is inverted in NOT logic N5 to apply a positive voltage to a second one of the three inputs of AND logic A13 to indicate that a north directional signal is not present. Another condition is that a positive voltage stopping signal T0 must not be present. If the binary output from the trolley binary subtractor is other than zero as in this case, the output from AND logic A15 will be zero voltage on conductor T0. This zero voltage is inverted in NOT logic N6 to apply a positive voltage to one of the three inputs of AND logic A16.

It will be apparent that AND logic A16 will not pass the lack of stopping signal indication unless two other conditions exist, namely, a trolley permissive signal must be present and neither a new aisle-side nor a bypass signal can be present. Since it is not safe to move the trolley unless the bridge and hoist are in predetermined positions, the trolley permissive signal will appear on conductor TC1 in FIG. 10 only if the hoist is at binary code position 9 and the bridge is in one of the cross aisles identified by binary codes 4 and 39. For this purpose, there is provided in FIG. 10 a trolley restriction circuit TRC comprising a logic OR14 and an AND logic A17. The two inputs of the OR logic are connected to output conductors B4 and B39 of bridge code recognition circuit BCR so that this OR logic will provide an output when the bridge is in either binary code position 4 or 39. The output of the OR logic is connected to one of the two inputs of the AND logic. The other input of the AND logic is connected to output conductor H9 of hoist code recognition circuit HCR. In this manner, the AND logic will provide an output only when the bridge is in position 4 or 39 and the hoist is in position 9. Since the bridge is in position 4 and the hoist is in position 9, the positive voltage trolley permissive signal from trolley restriction circuit TRC is applied through conductor TC1 to AND logic A16 at a second input thereof.

A new aisle-side signal or a bypass signal will not be present because the stepper is not at step 10 and contact NAS2 in FIG. 4 is open and because a bypass signal does not appear on output conductor CBP of card reader No. 1. Therefore, zero voltage is applied through conductor NBP in FIG. 4 to NOT logic N7 in FIG. 12 where it is inverted to a positive voltage and applied to the third and last input of AND logic A16. As a result, logic A16 operates timer T5 which delays the signal for 3 seconds and then applies a positive voltage to AND logic A13. Since this AND logic A13 now has three positive voltage inputs, it will provide a positive voltage output to AND logic A18 in FIG. 13. The output of AND logic A13 is also applied to logic OR12 for maintaining between proximity switch readings and is inverted in NOT logic N8 to apply zero voltage as in interlock to an input of AND logic A14 to prevent a north directional signal at the same time.

Figure 13:
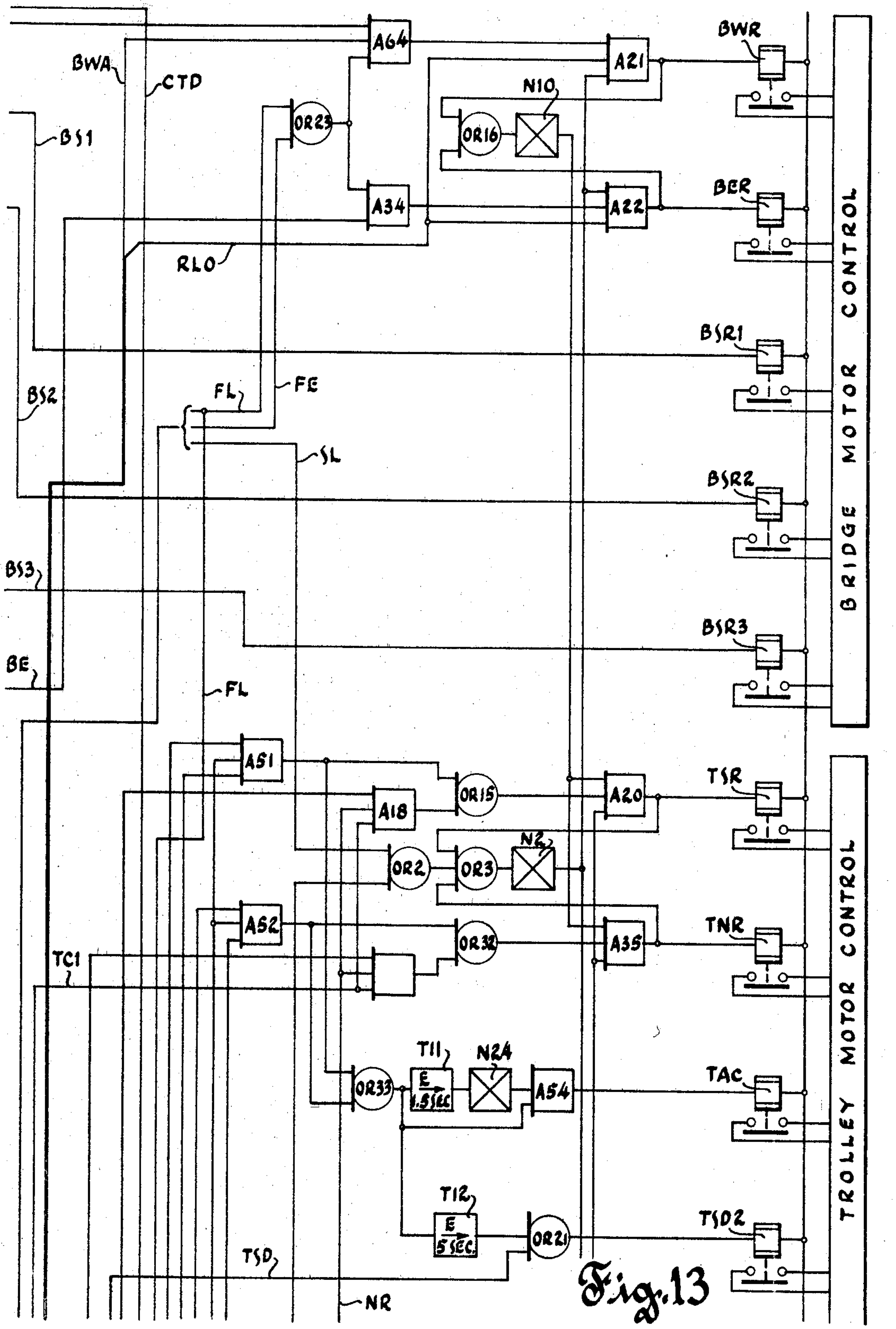

AND logic A18 in FIG. 13 has three inputs, one of which receives the south directional signal. A second input of this AND logic receives a positive voltage trolley permissive signal from conductor TC1. The third input of this AND logic receives a positive voltage if the fork is not being rotated toward either its north or south position. If that condition exists, then zero voltage from AND logics A7 and A8 in the rotate control circnuit in FIG. 10 are inverted in NOT logics N8 and N9 to apply positive voltages to the two inputs of AND logic A19. As a result, the latter applies a non-rotate signal through conductor NR to the third input of AND logic A18 in FIG. 13. This causes logic A18 to apply a positive voltage through logic OR15 to one of the three inputs of AND logic A20.

AND logic A20 permits trolley motion only if three other conditions coincide with the directional signal. Two of these conditions are that neither the bridge nor hoist must be moving. Since the bridge is not moving, zero voltages from AND logics A21 and A22 are applied through logic OR16 and inverted to positive voltage in NOT logic N10 and applied to a second input of AND logic A20. Since the hoist is not moving, zero voltages are similarly applied from AND logics A23 and A2 in FIG. 14 through logic OR17 and inverted in NOT logic N11 to positive voltage which is apied to the third input of AND logic A20. The third condition is that the setting of the program into step 2 of the store cycle must have been completed as indicated by a timed "program set" signal.

The program set signal which is a zero voltage is derived in the following manner and applied also to logic OR17 in FIG. 14. It will be apparent that a positive voltage applied to logic OR17 will prevent trolley motion and that zero voltage is required therefor. This zero voltage "program set" signal is derived from the stepping control circuit in FIG. 4 after the program has been set to step 2 as hereinafter described.

It will be recalled that a positive voltage was applied from logic OR11 in FIG. 4 through timer T4 in FIG. 3 to pulser P2 to obtain a stepping pulse for advancing stepper ST to position 2. This same positive voltage is applied from logic OR11 also through conductor STP to timer T6 in FIG. 14. Whereas timer T4 in the stepping circuit receives a positive voltage and provides a positive voltage after a time interval, timer T6 is of a different type as indicated by the reverse arrow whose output changes from positive voltage to zero voltage a timed interval after its input changes from positive voltage to zero voltage. In other words, timer T6 provides a timed interval after deenergization as indicated by D thereon whereas timer T4 provides a timed interval after energization.

Now then, it will be apparent that the positive voltage on conductor STP will maintain the output of timer T6 a positive voltage until the system has been completely set to step 2 of the program. When the stepper energized program relay PR2 to extract the second reading from the card reader into the binary subtractors, the trolley binary subtractor output went from zero to a difference of 3, thus terminating positive voltage T0 in the trolley direction and slowdown circuit and applying zero voltage through conductor T0 to AND logic A12 in the stepping control circuit in FIG. 3. This causes a program set signal to be applied by changing the voltage on conductor STP from positive to zero voltage. This program set signal is applied to timer T6 in FIG. 14 which delays it for half a second. That is, during this delay the positive voltage output of timer T6 is applied through logic OR17 and inverted to zero voltage in NOT logic N11 and applied to one input of AND logic A20 to delay trolley operation until the program has been fully set to step 2. At the end of this timed interval, the output of timer T6 switches to zero volts which is applied through logic OR17 and inverted in NOT logic N11 to positive voltage and applied to AND logic A20. Since the three inputs of AND logic A20 now have positive voltage, it functions to apply positive voltage to energize trolley south relay TSR. This relay consequently closes its contact to operate the trolley motor control circuit to run the trolley south toward binary code position 28.

Figure 12:
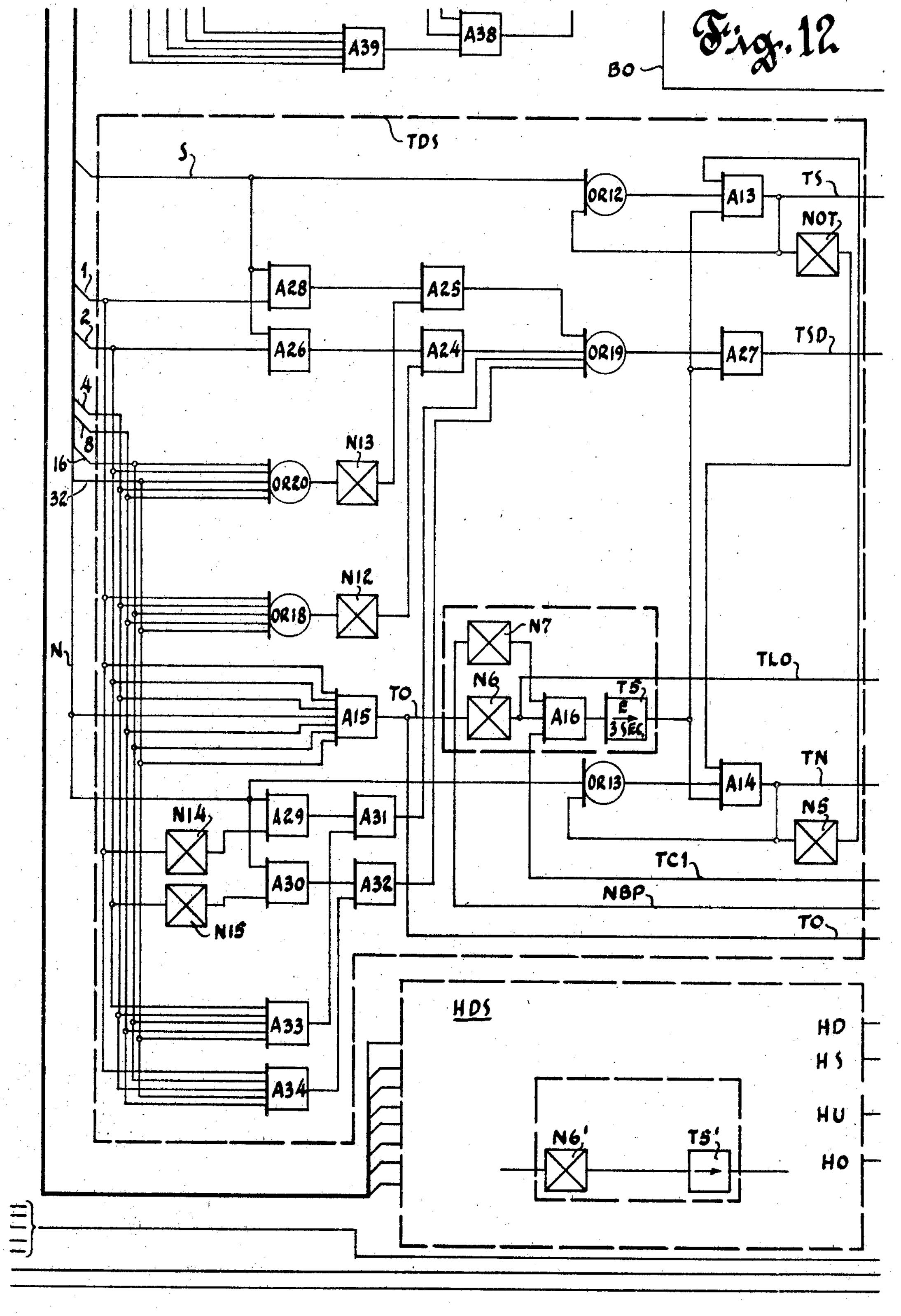

Since trolley direction and slowdown circuit TDS in FIG. 12 recognizes only binary difference numbers 2, 1 and 0, the trolley will continue to run southerly, in the manner aforesaid until its proximity reader reads binary code 30 giving a difference of 2. When this happens, a trolley slowdown signal appears on conductor TSD to reduce the trolley speed. This difference of 2 is indicated at the output of the trolley binary subtractor as a positive voltage on output conductor 2 and zero voltages on all the other output conductors 1, 4, 8, 16 and 32. Output S remains at positive voltage and output N remains at zero voltage.

Trolley direction and slowdown circuits TDS in FIG. 12 is provided at the upper portion thereof with logic circuits for controlling southerly motion as already described and also with logic circuits for recognizing binary codes 2 and 1 of a positive polarity. At the middle of circuit TDS there is provided an AND logic for recognizing a binary code of zero value already mentioned. And at the lower portion of circuit TDS there are provided logics for recognizing binary codes of 2 and 1 of a negative polarity and a north directional signal.

More specifically, the trolley south directional signal is applied at the upper part of circuit TDS through logics OR12 and A13. AND logic A24 provides a positive voltage only on binary code 2 whereas AND logic A25 provides a positive voltage only on binary code 1. For binary code 2, positive voltages from outputs 2 and S of the subtractor are applied to the two inputs of AND logic A26 whose positive voltage output goes to one of the two inputs of AND logic A24. Zero voltages are applied from subtractor TBS outputs 1, 4, 8, 16 and 32 to logic OR18 and the zero voltage output of logic OR18 is inverted by NOT logic N12 to apply a positive voltage to the o'her input of AND logic A24 for binary code 2. The positive voltage output of logic A24 is applied through logic OR19 to AND logic A27. The other input of AND logic A27 receives a positive voltage from timer T5 when the zero signal on conductor T0 is not present. Thus, the two positive voltage inputs cause AND logic A27 to provide a positive voltage slowdown signal on conductor TSD.

This slowdown signal is continued through difference binary code 1 and until a zero signal arrives which causes the trolley to be stopped. For binary code 1, positive voltages are applied from outputs 1 and S of the subtractor to the two inputs of AND logic A28 whose positive voltage output goes to one of the two inputs of AND logic A25. Zero voltages are applied from the subtractor outputs 2, 4, 8, 16 and 32 to logic OR20 and the zero voltage output of the latter is inverted in NOT logic N13 to apply a positive voltage to the other input of AND logic A25. The positive voltage output of the latter is applied through logic OR19 to one of the two inputs of AND logic A27, the other input of the latter being supplied with positive voltage from timer T5 as aforesaid. Thus, logic A27 provides a positive voltage slowdown signal on conductor TSD in response to binary code 1.

Referring to FIG. 13, it will be apparent that the trolley slowdown signal on conductor TSD is applied through logic OR21 to energize trolley slowdown relay TSD2. This relay closes its contact to operate the trolley motor control circuit to decrease the trolley speed to a low value preparatory to stopping the trolley on a zero binary code indication.

Referring again to the trolley direction and slowdown circuit TDS in FIG. 12, when the trolley reaches the desired position wherein trolley proximity reader TPR reads binary code 28 corresponding to the code read also from the punched card, trolley binary subtractor TBS will give a zero indication. This zero indication consists of positive voltage on all code outputs 1, 2, 4, 8, 16 and 32 and on directional output N and zero voltage on directional output S. As a result, AND logic A15 will receive positive voltages on all inputs to provide a positive voltage stopping signal on conductor T0. The switching of directional output S from positive voltage to zero voltage acts through logics OR12, A13, A18, OR15 and A20 to deenergize trolley south relay TSR and reopen its contact. This causes disconnection of power from the trolley motor and application of the brake to stop the trolley at the correct position.

The trolley stopping signal is applied through conductor T0 back to the stepping control circuit in FIG. 3 to cause the stepper to step to position 3 as a result of the step 2 signal on conductor 2, the fork rotate north position signal on conductor NLS and the trolley stopping signal on conductor T0 coinciding at AND logic A10 in FIGS. 3 and 4.

Figure 16:
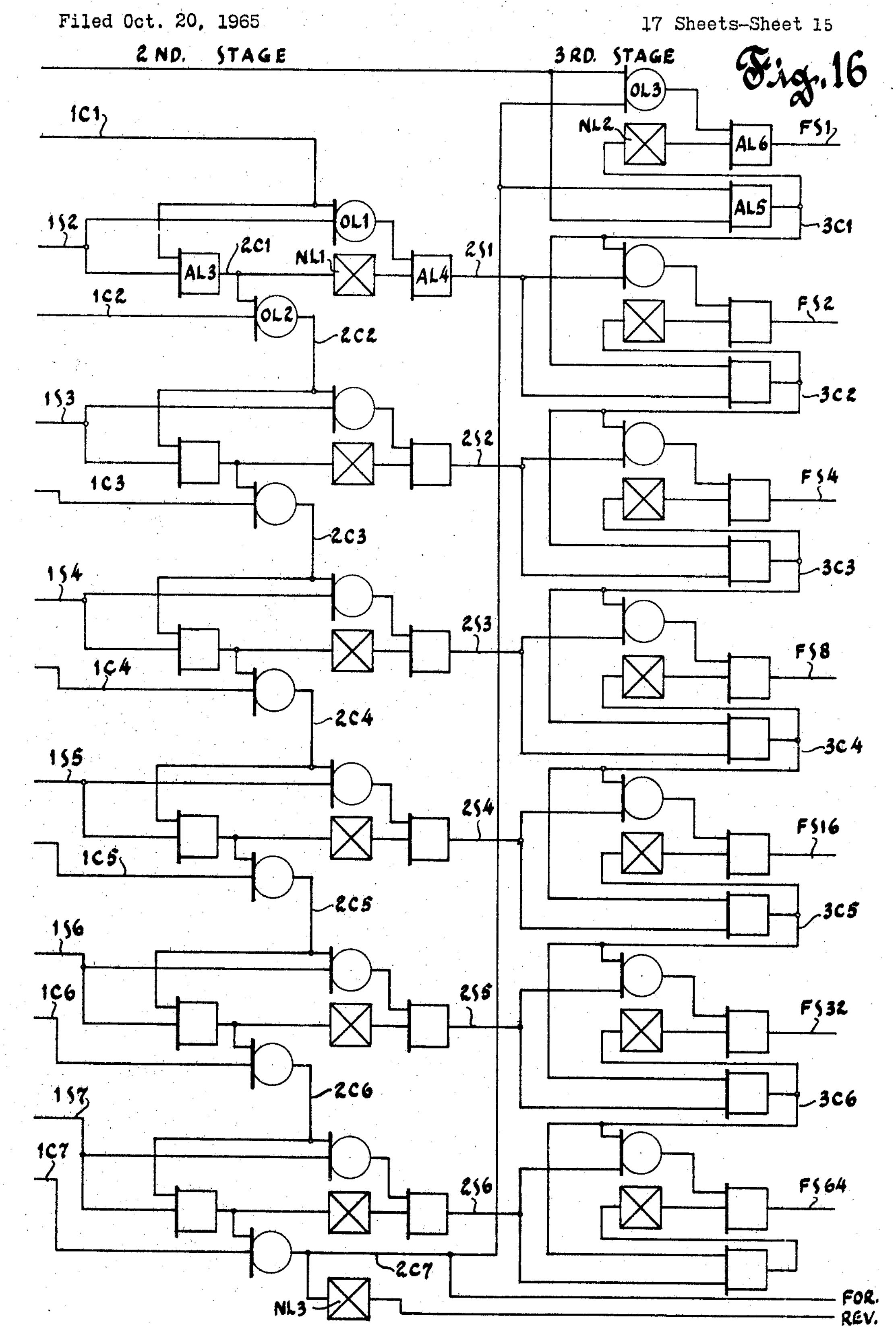

The trolley direction and slowdown circuit TDS in FIG. 12 is also provided with logics at the lower portion thereof for recognizing difference binary codes of negative polarity and a signal on directional output N of the subtractor when northerly trolley movement is indicated. The negative polarity comes about when the subtrahend read from the punched card has larger magnitude than the minuend read by the proximity reader. As will hereinafter appear when the binary subtractor shown in FIGS. 15 and 16 is described, on outputs of negative polarity the bits of the binary number will be inverted, that is, the binary subtractor will provide zero voltage for each 1 bit and positive voltage for each 0 bit. Binary subtractor TBS will also provide positive voltage on directional output N along with the inverted binary code output.

At the lower portion of circuit TDS in FIG. 12, NOT logics N14 and N15 invert the zero voltage binary code bits indicative of negative difference numbers 1 and 2 and apply positive voltages to first inputs of AND logics A29 and A30, respectively. The other inputs of the two AND logics are supplied with positive voltage from subtractor output N. The positive voltage at output N is applied through similar logics to energize trolley north relay TNR as described in connection with the trolley south direction signal. The positive voltage outputs of AND logics A29 and A30 are applied to first inputs of AND logics A31 and A32, respectively. To render AND logics A31 and A32 responsive only to binary codes 1 and 2, respectively, the other inputs thereto are supplied with positive voltages from a pair of AND logics A33 and A34 whose inputs are connected to subtractor code outputs other than binary 1 and subtractor code outputs other than binary 2, respectively. The positive voltage outputs of AND logics A31 and A32 are applied to logic OR19 in the manner hereinafter described in connection with south directional operation to provide the trolley slowdown signal.

Hoist direction and slowdown circuit HDS in FIG. 12 is similar to the trolley direction and slowdown circuits TDS hereinbefore described except for the difference in the broken line rectangle and has been shown schematically to avoid unnecessary duplication. The difference is in that NOT logic N7, AND logic A16, the new aisle or side and bypass signal input conductor NBP, permissive trolley input signal conductor TC1 and trolley not at final position signal output conductor TL0 have not been used in the hoist direction and slowdown circuit. In the latter circuit, the absence of a "hoist at zero" code indication is applied as a positive voltage directly from NOT logic N6′ to timer T5′ whereby the latter provides positive voltage for gating the hoist directional and slowdown logics similar to logics A13, A14 and A27 in trolley circuit TDS.

Let it be assumed that card reader No. 1 reads the following information on the third step of the program—

Step 3:

| | |
|---|---|
| Bridge | **20** |
| Trolley | Same |
| Hoist | **7** |
| Rotate | Same |

This information will cause the bridge to move east to binary position 20 and will cause the hoist to lower to binary position 7. These movements of the bridge and hoist will take place at the same time except that timer T7 in FIG. 14 will delay lowering of the hoist for a predetermined time interval to allow time for the bridge to move away from the loading dock.

It will be recalled that hoist up relay HUR was interlocked at AND logic A2 with both trolley directional signals so that the fork could be raised only if the trolley was not being operated. In addition to a similar interlock with the trolley, hoist down relay HDR in FIG. 14 is provided with an additional interlock at AND logic A23 from conductor NR. This is the same interlock that was provided for the trolley over conductor NR as hereinbefore described and permits lowering of the fork only if it is not being rotated toward its north or south rotary position. Otherwise, the hoist down operation is similar to the hoist up operation heretofore described.

For bridge operation from its home position at binary code 4 to binary position 20, bridge binary subtractor BBS in FIG. 9 provides positive voltage on directional output E to initiate easterly movement of the bridge. This voltage is applied from output E through logics OR22 and A33 to bridge east conductor BE. This positive voltage on bridge east conductor BE is obtained in the same manner as the directional voltage on trolley north conductor TN hereinbefore described. This voltage is applied from conductor BE to AND logic A34 in FIG. 13 and passed therethrough provided a fork loaded or a fork empty signal is also present at the same time.

Since the fork is loaded and the load is not split or skewed, all three limit switches FRS, FMS and FLS in FIG. 6 are closed. Consequently, AND logic A3 provides a positive voltage fork loaded signal through conductor FL to logic OR23 in FIG. 13 and from there to the other input of AND logic A34 causing the bridge east signal to be passed on to one of the three inputs of AND logic A22. Another input of AND logic A22 receives an interlocking positive voltage from the trolley circuit to indicate absence of trolley directional signals and allowing bridge movement only if the trolley is not running. This trolley interlocking signal is taken from the outputs of AND logics A20 and A35 and applied to two inputs of logic OR3. The latter detects two other conditions, that is, the absence of a split or skewed load and program completely set which must be present to allow bridge movement. A split or skewed load would be indicated by positive volttgae on conductor SL which would be applied through logics OR2 and OR3 and inverted to zero voltage in NOT logic N2 to prevent bridge motion at logic A21 or A22. If the program is not completely set, logic OR2 would receive positive voltage from timer T6 similarly to prevent bridge motion. The absence of split or skewed load and program set indications are indicated in logic OR2 and the resultant is indicated with the trolley interlocking signal in logic OR3 whose output is then inverted in NOT logic N2 and applied to AND logic A22 to permit bridge motion.

The third and last condition required to permit bridge motion is an indication that rotary motion of the fork has been completed. If the fork has been fully rotated to its north or south position, positive voltage is applied from the appropriate limit switch LSN or LSS in FIG. 10 to one of the input terminals of logic OR24 and then through conductor RLO to the third input of AND logic A22 in FIG. 13. Since all three inputs now have positive voltage, logic A22 applies positive voltage to energize bridge east relay BER. As a result, this relay closes its contact and operates the bridge motor control circuit to run the bridge east at its base speed until a slowdown signal is applied.

Figure 8:
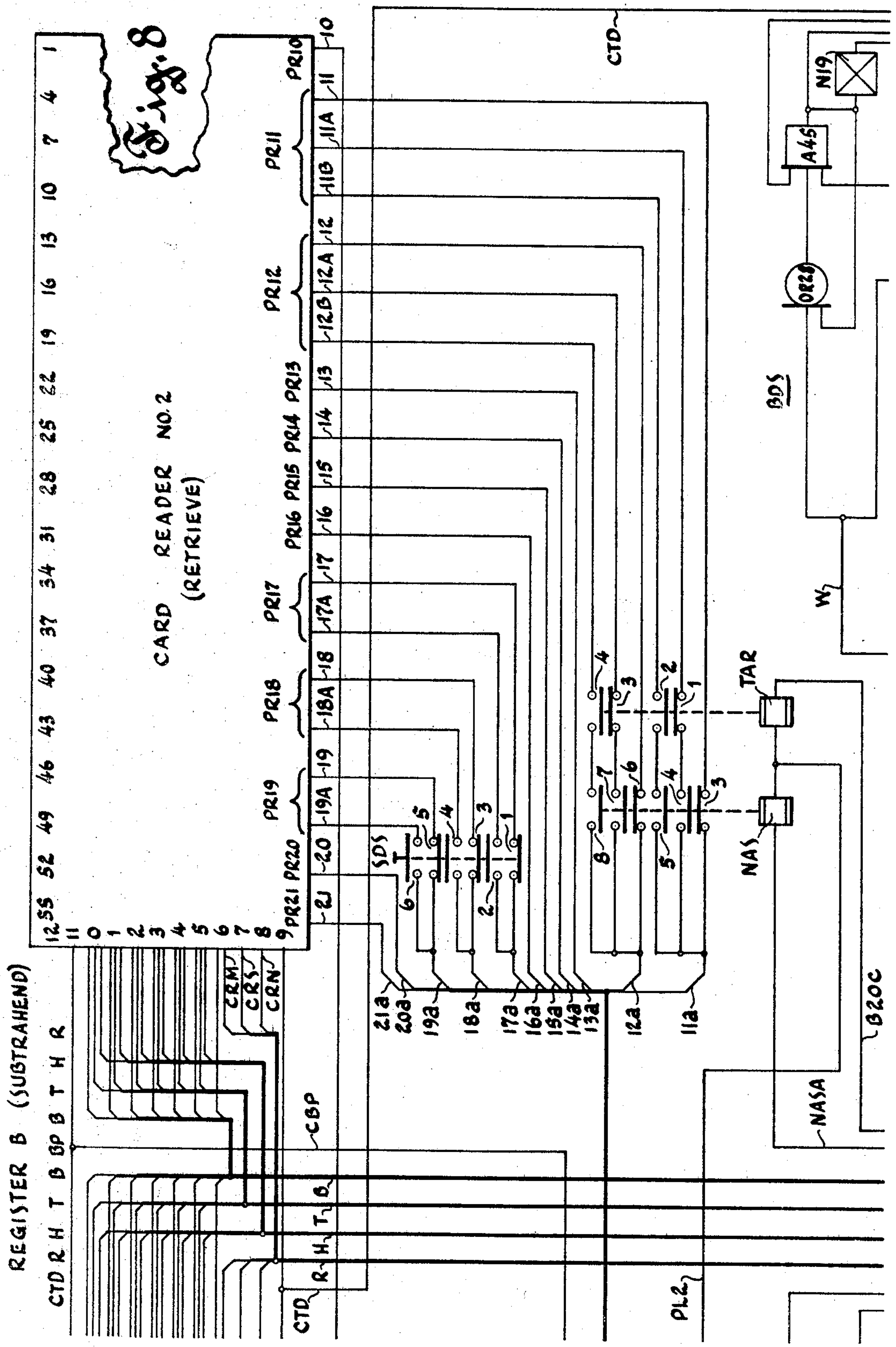
Figure 11:
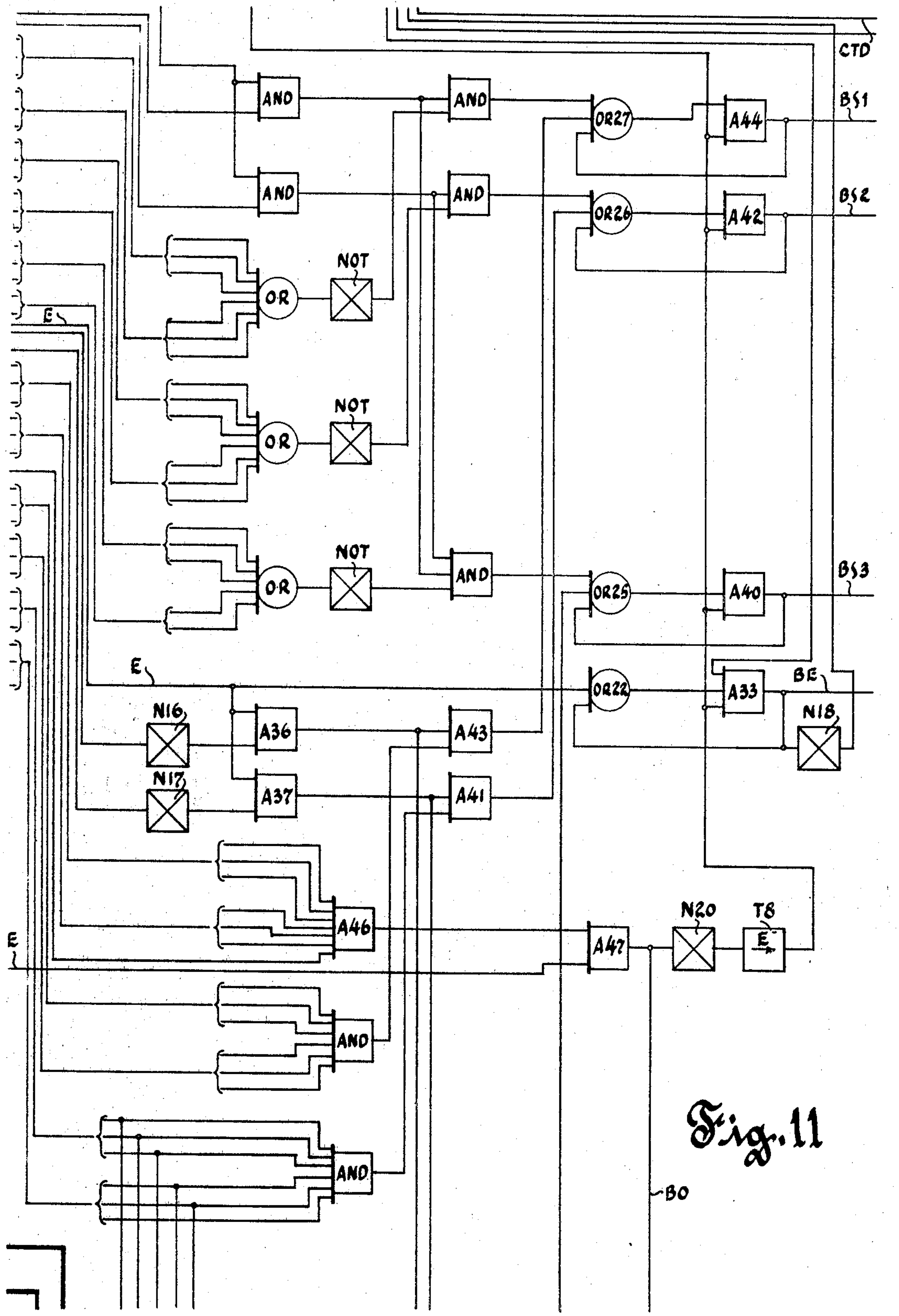

Bridge direction and slowdown circuit BDS in FIGS. 8, 11 and 12 responds to the directional signal from the subtractor as hereinbefore described but recognizes only binary difference codes 3, 2, 1 and 0 although the bridge binary subtractor will indicate differences up to a decimal value of 127, since slowdown is started at a difference of 3. The difference of 3 when the bridge reaches position 17 is indicated at outputs 1 and 2 of the bridge binary subtractor, these binary bits being in inverted form since the difference is negative, that is, 17 minus 20 is minus 3. These zero voltages at outputs 1 and 2 are inverted by NOT logics N16 and N17 to apply positive voltages to first inputs of AND logics A36 and A37. The positive voltage directional signal is applied from conductor E to the other inputs of logics A36 and A37 and the positive voltage outputs of the latter are applied to two inputs of AND logic A38 at the upper portion of FIG. 12. The third positive voltage input to logic A38 is obtained from subtractor outputs 4, 8, 16, 32 and 64 through AND logic A39. Therefore, a positive voltage output from logic A38 indicates only binary code 3. This voltage is applied through logic OR25 to AND logic A40 along with a not zero indication from timer T8. As a result, logic A40 applies a positive voltage slowdown signal through conductor BS3 to energize bridge slowdown relay BSR3. This relay closes its contact to operate the bridge motor control circuit in a manner causing a first slowdown step.

As the bridge slows down but continues to move closer to binary position 20, the difference binary codes 2 and 1 are detected in succession in a manner similar to that described in connection with trolley slowdown except that these codes cause slowdown signals to be applied successively to separate slowdown conductors BS2 and BS1 rather than to a single conductor as in the case of the trolley. To this end, the binary code 2 positive voltage is applied from logic A41 through logic OR26 and then through logic A42 when a zero differenec indication is not present to slowdown conductor BS2 for energizing bridge slowdown relay BSR2. In a similar manner, the binary code 1 positive voltage is applied from logic A43 through logic OR27 and then through logic A44 when a zero difference signal (bridge stopped signal) is not present to slowdown condutcor BS1 for energizing bridge slowdown relay BSR1 in FIG. 13. These signals are applied through power AND units (not shown) for energizing slowdown relays BSR2 and BSR1, respectively.

In connection with the above description of bridge operation it will be apparent that the bridge east signal output of logic A33 is applied back to an input of logic OR22 to maintain directional relay BER energized until the zero difference binary code is recognized. In a similar manner, the output of logic A40 is fed back to an input of logic OR25 to maintain slowdown relay BSR3 energized when the binary difference decreases to 2 and 1 and until the zero difference binary code is recognized.

Also in like manner, the outputs of logics A42 and A44 are fed back to inputs of their respectively preceding logics OR26 and OR27 for similar maintaining purposes with respect to the other two slowdown relays.

Bridge direction and slowdown circuit BDS is also provided with interlocking means for preventing energization of both west and east directional relays BWR and BER at the same time. To this end, the positive voltage output of logic A33 is inverted in NOT logic N18 to apply zero voltage to one input of logic A45 thereby to prevent energization of relay BWR when relay BER is energized. The output of logic A45 is not only fed back to its preceding OR logic OR28 for maintaining purposes but is also cross-connected through NOT logic N19 to an input of logic A33 to prevent energization of relay BER when relay BWR is energized.

From the foregoing description of operation of bridge direction and slowdown circuit BDS, it will be apparent that it is similar to hoist direction and slowdown circuit HDS except that it is arranged to receive a seven bit binary code rather than a six bit binary code and provides three separate slowdown signals in response to binary codes 3, 2 and 1 rather than a single slowdown signal in response to binary codes 2 and 1.

When the bridge reaches the designated position 20, two things are done, that is, the bridge is stopped and a turn-around control relay is energized. The bridge is stopped by recognizing a zero difference binary code and the turn-around control relay TAR is energized by a circuit which recognizes the binary code 20 when it is read by the bridge proxmity reader. The purpose of the turn-around relay is to cause the bridge to go to the nearest cross aisle when the fork is to be rotated.

For stopping the bridge, the zero difference binary code is indicated by positive voltage (inverted output) on all of the seven binary bit outputs of the bridge binary subtractor and on directional output E and zero voltage on directional output W thereof. These positive voltages operate AND logic A46 and A47 to apply a positive voltage on bridge stopped conductor BO. This positive voltage is inverted in NOT logic N20 to zero voltage which is applied through timer T8 to switch the output of logic A33 from positive voltage to zero voltage thereby terminating the bridge east signal. This causes relay BER to deenergize and reopen its contact whereby power is disconnected from the bridge motor and the brake is applied. The bridge speed by this time has been reduced to zero so that the brake can be applied.

For energizing turn-around relay TAR, bridge proximity reader BPR in FIG. 6 reads binary code 20 which is recognized by the circuit at the lower portion of bridge code recognition circuit BCR in FIG. 7. This circuit comprises an OR logic, a NOT logic and an AND logic arranged to recognize only binary code 20 and to provide a positive voltage on conductor B20. This positive voltage is applied in FIG. 10 through self-maintaining logics OR29 and A48 and then through conductor B20*c* and the operating coil of relay TAR to power line PL2 in FIG. 3. The other input of logic A48 in FIG. 10 is supplied with positive voltage from the output of NOT logic N21 since the input thereto from reset conductor RST has zero voltage. The output of logic A48 is fed back to one input of logic OR29 to maintain relay TAR energized. As will be apparent, relay TAR can be restored by applying positive voltage to reset conductor RST by contact 2 of the GO switch in FIG. 3.

The third step of the program has now been completed and stepper ST should be stepped to its fourth position. This is done automatically by the aforementioned bridge stopped indicating positive voltage on conductor B0. This voltage is applied in FIG. 3 to an input of logic A12. This causes operation of the stepper to position 4 in the same manner hereinbefore described in connection with signals on trolleys and hoist stopped conductors T0 and H0.

The fork having the article resting thereon is now directed to the north in a longitudinal aisle corresponding to trolley binary code 28 at a point in such aisle corresponding to bridge binary code 20 and at a height corresponding to hoist store binary code 7. Under these conditions, the next thing to be done is to cause side motion of the trolley whereby to move the article into a bin. This is done under the control of information read on step 4 from columns 10–12 of the punched card. If the bin is not full, the information on step 5 from the next three columns 13–15 of the punched card will direct the system to lower the fork so as to deposit the article in the bin and then to back the fork into the aisle. The stepper will then step through steps 6, 7, 8 and 9 without effect to step 10, wherein the retrieve cycle is started under the control of card reader No. 2.

As will be apparent from the typical storing cycle hereinbefore described, if the bin is full this condition will be detected and the article will be returned to the pick-up station in the west aisle and the system will be cleared.

Returning to step 4 of the storing cycle, card reader No. 1 will read the following information from columns 10–12 of the punched card—

Step 4:

| | |
|---|---|
| Bridge | Same. |
| Trolley | Same and CDT (side motion signal). |
| Hoist | Same. |
| Rotate | Same. |

Figure 14:
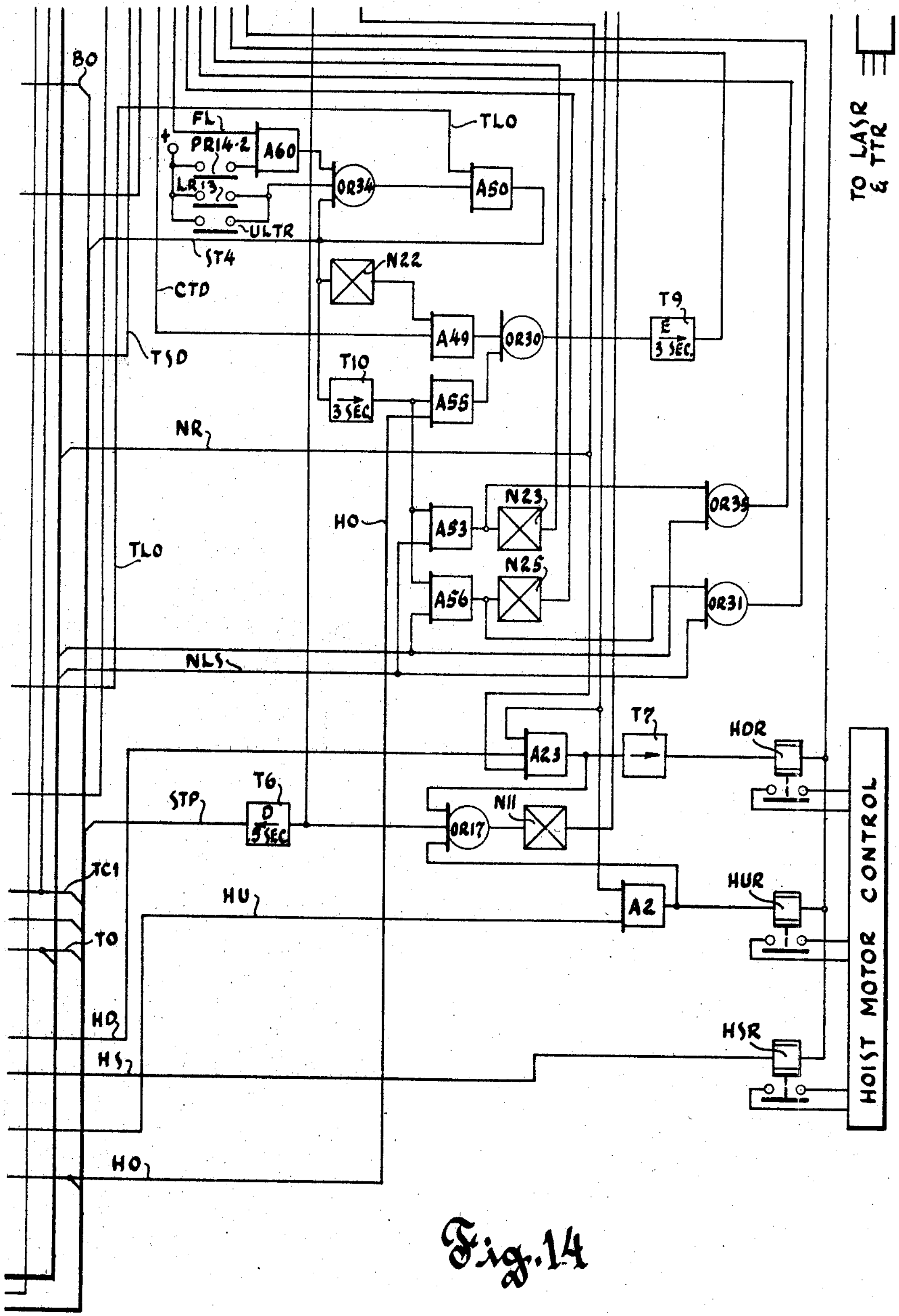

This side motion signal will be applied from the card reader as a positive voltage through conductor CTD in FIG. 8 to one of the two inputs of AND logic A49 in FIG. 14. The other input of AND logic A49 receives positive voltage from NOT logic N22 as a result of the inversion therein of the zero voltage output of AND logic A50.

For AND logic A50 to have the requisite zero voltage output in order to permit movement of the load into the bin, certain conditions must be present any one of which could prevent or stop side motion of the trolley. Limit switch contact ULTR being open indicates that the side motion has not been completed. Contact LR13 of the bin-full relay LR being open indicates that the bin is empty. Contact 2 of the fourteenth step program relay PR14 being open indicates that the system is in a storing cycle rather than a retrieve cycle. Zero voltage on conductor TL0 indicates that the trolley is at the final position called for by the punched card.

The positive voltage output of AND logic A49 is applied through logic OR30 and a three second timer T9 to first of three inputs of AND logics A51 and A52 which control trolley side motions south and north, respectively. To cause the side motion to be north, positive voltage is applied from north rotate position limit switch LSN in FIG. 10 through conductor NLS and logic OR31 in FIG. 14 to a second input of AND logic A52 in FIG. 13. Since the output of AND logic A50 is at zero voltage as aforesaid, this output is applied through timer T10 to one input of AND logic A53 to prevent operation thereof. As a result, the zero voltage output of AND logic A53 is inverted in NOT logic N23 to provide positive voltage to the third input of AND logic A52 in FIG. 13.

As all three inputs of AND logic A52 now have positive voltages as aforesaid, the positive voltage output thereof is applied through logic OR32 to one input of AND logic A35. Since the other necessary conditions are present, bridge and hoist not operating, the other two inputs of AND logic A35 will have positive voltages whereby the positive voltage output thereof will operate the trolley in the northerly direction.

To reduce the cycle time to an optimum short value, the trolley side motion is provided with means affording timed acceleration and deceleration. For this purpose, the positive voltage output of AND logic A52 in FIG. 13 is used not only as a directional signal as aforesaid but is also applied through logic OR33 directly to the lower input of AND logic A54. The positive voltage output of logic OR33 is applied at the same time to timer T11 which takes a period of one and one-half seconds or the like to operate depending upon how long the trolley should be accelerated. But before timer T11 times out, its output is at zero voltage which is inverted in NOT logic N24 to apply positive voltage to the upper input of AND logic A54. The positive voltage output of AND logic A54 is applied to energize trolley accelerating relay TAC to accelerate the trolley for one and one-half seconds. When time T11 times out, its output switches from zero to positive voltage to deenergize relay TAC and to terminate trolley acceleration.

The trolley is then decelerated so that it can be stopped when a proximity sensing limit switch detects that the side motion is approaching completion in that the article has been moved into the bin. For this purpose, the positive voltage output of logic OR33 is applied also to timer T12 having a period of five seconds or the like sufficient to decelerate the trolley to a very slow speed when it reaches the end of its side motion. Five seconds after the trolley is started toward the bin, timer T12 times out and applies positive voltage through logic OR21 to energize slowdown relay TSD2 to cause deceleration of the trolley as hereinbefore described.

When the trolley reaches its final position, a proximity limit switch operates and closes contact ULTR in FIG. 14 to stop the trolley. This contact applies positive voltage through logic OR34 to one of the two inputs of AND logic A50. Positive voltage was applied to the other input of AND logic A50 from conductor TL0 when the side motion started and the trolley moved away from the position called for the punched card. As a result, AND logic A50 provides a positive voltage side-motion-into-bin complete signal. This signal does three things; that is, it maintains itself until the trolley returns to the aisle, it stops the side motion and it steps the program to position 5. To this end this positive voltage is fed back into an input of logic OR34 for self-maintaining purposes. This positive voltage is inverted in NOT logic N22 to switch one input of AND logic A49 to zero voltage thereby blocking the side motion command signal on conductor CTD from passing therethrough. This causes restoration of directional relay TNR and slowdown relay TSD2.

To step the program stepper to step 5, the positive voltage output from logic A50 is also applied through conductor ST4 to one of the three inputs of AND logic A11 in FIG. 4. The second input of AND logic A11 is supplied with positive voltage from conductor NLS through logic OR9 and the third input thereto is supplied with positive voltage from power line PL3 through the contact of program relay PR4 and conductor 4. Consequently, logic All applies positive voltage through logic OR11 to the STEP conductor and therethrough to cause the stepper to be stepped to position 5 in the manner hereinbefore described.

During the one-half second delay of the signal on conductor STP in timer T6 in FIG. 14, the program is completely set into the new position 5 whereafter the hoist can be lowered as called for by the punched card to deposit the load in the bin. Since the hoist was in binary code position 7 when the fork moved into the bin, the hoist must be lowered to binary code position 6 to deposit the load in the bin whereafter the trolley is operated reversely to back the empty fork back into the aisle.

In step 5 of the storing cycle, the card reader will read the following information from the punched card—

Step 5:

| | |
|---|---|
| Bridge | Same |
| Trolley | Same and CTD signal |
| Hoist | 6 |
| Rotate | Same |

It will be recalled that although the signal remains on conductor CTD it is blocked at logic A49 by the output of logic A50 inverted by logic N22 to zero voltage. The positive voltage from logic 50 is also applied to timer T10 which delays it for three seconds.

During this timed delay, the hoist lowers to deposit the article in the bin. For this purpose, the card reader reads 6 and subtractor HBS subtracts it from the actual hoist position 7 to provide a difference binary code 1. Thus difference code operates hoist direction and slowdown circuit HDS in FIG. 12 to provide positive voltage outputs on conductors HD and HS. Since the bridge and trolley directional relays are not energized, logic A23 in FIG. 14 passes the positive voltage from conductor HD therethrough and it is then applied through timer T7 to energize hoist down relay HDR. The voltage on conductor HS is applied to energize hoist slowdown relay HSR. As a result, the hoist is lowered at a slow speed to binary mode position 6; that is, the hoist is lowered past the center line of the bin to deposit the load in the bin. The hoist is then stopped in the manner hereinbefore described and circuit HDS in FIG. 12 provides a positive voltage on conductor H0 to indicate that the hoist has been stopped in the position called for by the code on the punched card.

The trolley will be allowed to back into the aisle as soon as the lowering operating has been completed. This will occur when timer T10 has timed out and the hoist stopping signal has appeared on conductor H0 as aforesaid. At the end of three seconds, timer T10 applies a positive voltage to one of the two inputs of AND logic A55 whose other input is supplied with positive voltage from conductor H0 indicating that the hoist is in the position called for by the punched card. Consequently, AND logic A55 applies a positive voltage through logic OR30 to timer T9 where it is delayed for three seconds and then applied to one input of reverse torque control AND logic A51. The second input of logic A51 is supplied with positive voltage through logic OR35 from the output of AND logic A53 because both inputs of the latter now have positive voltage. The third input of logic A51 receives positive voltage from inverting NOT logic N25 because the output of AND logic A56 feeding it is at zero voltage. Since all three inputs of logic A51 have positive voltage, the output thereof will pass through logics OR15 and A20, because the bridge and hoist are not moving, to energize relay TSR and apply reverse torque to back the trolley into the aisle. This reverse torque is terminated and the trolley is stopped when it reaches the position in the aisle called for by the punched card.

When the empty fork is backed by the trolley all the way back into the aisle, the trolley proximity reader will again read the same code being read from the punched card. As a result, in trolley direction and control circuit TDS in FIG. 12, the zero indiaction will reapper when the output of logic A15 switches from zero voltage to positive voltage. This switches the voltage on conductor TL0 from positive voltage to zero voltage to terminate the trolley-not-at-final-position signal and thereby to switch the output of logic A50 to zero voltage. As a result this zero voltage is applied through timer T10 and logics A53, OR35, A51, OR15 and A20 to deenergize relay TSR and stop the trolley.

This return of the trolley into the aisle in the position called for by the punched card causes the program to be stepped to step 6. To this end, the trolley zero difference positive voltage is applied through conductor T0 back to logic A12 in the stepping control circuit in FIG. 3. Logic A12 applies a positive voltage to a first input of AND logic A10. Logic OR9 applies a positive voltage to a second input of logic A10 from conductor NLS leading from north indicating rotate position limit switch LSN in FIG. 10. The third input of logic A10 receives positive voltage from power line PL3 through the contact of program relay PR5 and conductor 5. These inputs cause the output of logic A10 to switch from zero voltage to positive voltage which is then applied through logic OR11 to the step conductor to operate stepper ST to step 6.

Since the storing cycle has now been completed, the stepper will be stepped to step 10 without effect wherein the retrieve cycle may be started. These idle steps off the program stepper through which it is advanced by pulses on conductors 6, 7, 8 and 9 have no function in a norman storing operation but are reserved for returning the load back to the home position in the event the bin in which the load was attempted to be deposited was full as hereinafter described.

RETRIEVE CYCLE

The operation of the system in a retrieve cycle will now be described. It will be understood that in this cycle the empty fork will travel to the bin from which an article is to be picked up, which may be the same aisle in which an article was stored or a different aisle, will pick up the article and will convey it to a selected one of two set stations in the west aisle of the bridge.

In step 10 of stepper ST, program relay PR10 in FIGS. 3 and 4 opens contact 2 without effect as contact 1 of relay LR in parallel therewith is closed, the purpose of this contact 2 of relay PR10 being to clear the system when a full bin is detected on storage. Relay PR10 also closes its contact 1 in FIG. 4 to apply positive voltage from power line PL3 through conductor 10 and contact NAS1 to logic OR10 and therethrough to one of three inputs of AND logic A10. If the other two conditions are present, this positive voltage will step the program to step 11. These other two conditions are a positive voltage on fork rotate position conductor NLS applied through logic OR9 to another input of AND logic A10 and positive voltages on all three zero difference code conductors B0, T0 and H0 which would be applied through logic A12 to the third input of AND logic A10. Such positive voltage on conductor NLS would indicate that the article to be retrieved is on the same side of the aisle requiring no fork rotation. Such positive voltage on conductor T0 would indicate that the article to be retrieved is in the same aisle as the article which was just stored so that no change in the trolley position is necessary in order to retrieve the article from the bin. Under such conditions, the procedure would be to move the bridge and hoist to the proper positions, cause side motion of the trolley into bin, hoist up one position to cause the fork to pick up the article, back the trolley into the aisle, move bridge to home and hoist to rotate position 9 and rotate fork to middle, move trolley to set down position No. 1 or No. 2, lower load onto station, after time delay for load removal raise fork to rotate position 9, move trolley to home, lower fork to pickup position 6 and clear system.

In the event the article to be retrieved is in a new aisle and side, the bridge will first move to one of the cross aisles to allow the trolley to be shifted opposite the new aisle and turned if necessary whereafter the aforementioned procedure or sequence of retrieve movements would take place. If in the storing operation the bridge reaches any binary code position up to and including binary code position 19, the bridge will return to the west cross aisle for new trolley position and turn around of the fork but if the bridge has reached binary code position 20 or gone beyond, the turn around relay will cause the bridge to go to the middle cross aisle for shifting of trolley and rotation of the fork. In this manner, the bridge will have to move only the minimum distance to the nearest cross aisle to allow the trolley to move to a new aisle and to allow the fork to rotate.

It will be recalled that following storage of the article, the fork was left in the following position:

| | |
|---|---|
| Bridge | 20 |
| Trolley | 28 |
| Hoist | 6 |
| Rotate | North |

The next thing to be done is to determine whether a new trolley position is necessary for the retrieve cycle. While this is being done, the system will tell the bridge, hoist and rotary device to stay where they are by having card reader No. 1 read the following information from the last three columns 43–45 of the store card at program step 10—

Step 10:

| | |
|---|---|
| Bridge | Same |
| Trolley | No code |
| Hoist | Same |
| Rotate | Same |

At the same time at program step 10, card reader No. 2 will read the following information from the first three columns of the retrieve card:

| | |
|---|---|
| Bridge | No code |
| Trolley | 24 |
| Hoist | No code |
| Rotate | No code |

In the above reading it has been assumed that the trolley must move to a new aisle to retrieve an article at trolley binary code position 24.

It will be apparent from FIG. 8 that new aisle and side relay NAS and turn around relay TAR determine the program that will be selected from three alternatives as shown in FIGS. 18 and 19. If a new aisle and side is not required for the fork, that is, if the article to be retrieved is in the same aisle and side, relay NAS will remain in the position shown whereby contacts 3 and 6 thereof select programs 11 and 12. If a new aisle and side is required for the trolley and the bridge is in a code position from 4 to 19, relay NAS will be energized whereby contacts 4 and 7 thereof with contacts 1 and 3 of relay TAR will select programs 11A and 12A. These programs will move the bridge to the west cross aisle for trolley movement and rotation of the fork. If a new aisle and side is required for the trolley and the bridge is in a code position from 20 up to binary code position 71 or the like, both relays NAS and TAR will be energized whereby contacts 5 and 8 of relay NAS and contacts 2 and 4 of relay TAR will select programs 11B and 12B. These programs will move the bridge to the middle cross aisle at binary code position 39 for trolley movement and fork rotation.

If the trolley difference binary code from subtractor TBS in FIG. 9 at program step 10 is not zero, this indicates that a new aisle is called for. This difference code is binary code 4 since the trolley is to go from position 28 to 24. This difference code, however, will not cause the trolley to move yet but will cause the proper program to be selected. Referring to FIG. 10 it will be seen that in step 10 of the program stepper, relay PR10 will also close its contact 3 to apply positive voltage from power line PL3 to one of the two inputs of AND logic A57. The other input of logic A57 receives positive voltage from NOT logic N26 which inverts the zero voltage now appearing on conductor TO due to difference binary code. As a result, AND logic A57 applies positive voltage to timer T13 which delays it for one second and then applies it through logic OR36 to one of the two inputs of AND logic A58. The other input of logic A58 receives positive voltage from NOT logic N21 which inverts the zero voltage now appearing on reset conductor RST. The positive voltage output of logic A58 is applied through conductor NASA to energize relay NAS in FIG. 8 which is connected to power line PL2. Relay NAS opens contacts 3 and 6 and closes contacts 4, 5, 7 and 8.

Since the bridge was previously moved to binary position 20 and relay TAR was energized as hereinbefore described, the aforesaid energization of relay NAS connects the contact of program relay PR11 in FIG. 4 through conductor 11*a*, contact 5 of relay NAS and contact 2 of relay TAR to select program 11B which is shown in FIG. 19. The contact of program relay PR12 in FIG. 4 is connected through conductor 12*a*, contact 8 of relay NAS and contact 4 of relay TAR to select program 12B shown in FIG. 19.

AND logic A58 also applies its positive voltage output back to one input of logic OR36 for self-maintaining purposes to maintain relay NAS energized for the remainder of the steps of the retrieve cycle.

Upon being energized as aforesaid, relay NAS also steps the program stepper to step 11. For this purpose, relay NAS opens its contact 1 and closes its contact 2 in FIG. 4. Contact 2 of relay NAS applies positive voltage from power line PL3 through contact 1 of program relay PR10, conductor 10 and logic OR11 to the STEP conductor to advance the stepper to step 11. This causes selection of program 11B which is:

| | |
|---|---|
| Bridge | 39 |
| Trolley | 19 |
| Hoist | 9 |
| Rotate | South |

In the manner hereinbefore described, the bridge and hoist move to their binary code positions 39 and 9, respectively. Bridge position 39 corresponds to the center aisle wherein space is available for rotating the fork and hoist position 9 is above head level wherein the fork can be safely rotated. Trolley movement is prevented by trolley restriction circuit TRC in FIG. 10 until the bridge and hoist have reached the aforesaid positions. Fork rotation is prevented by rotate restriction circuit RRC in FIG. 10 until the trolley has reached position 19.

When the bridge reaches the center aisle at code position 39, positive voltage on conductor B39 from bridge code recognition circuit BCR in FIGS. 6 and 7 is applied through logic OR14 in FIG. 10 to one of the two inputs of AND logic A17. When the hoist reaches code position 9, positive voltage is applied from hoist code recognition circuit HCR in FIG. 10 through conductor H9 to the other input of logic A17. This causes logic A17 to apply a trolley permissive positive voltage signal through conductor TC1 to permit the trolley to run to code position 19 in the manner hereinbefore described and to stop therein.

Trolley code recognition circuit TCR in FIGS. 6 and 7 responds to this trolley position and applies positive voltage through conductor T19 in FIG. 10 to one input of AND logic A5. The other two inputs thereof receive positive voltage from conductors B39 and H9 to cause logic A5 to apply a positive voltage, rotate permissive signal through logic OR7 to timer T3. After this time interval of three seconds, timer T3 applies positive voltage to one of the two inputs of AND logic A8. The other input of the latter receives positive voltage in response to reading of the card as follows: Card reader No. 2 reads the rotate south code and applies positive voltage in FIG. 8 through conductor CRS to one of the inputs of AND logic A59 in FIG. 10. The other input of logic A59 receives positive voltage from NOT logic N27 due to inversion of its zero voltage input. As a result logic A59 applies positive voltage through logic OR37 to the other input of AND logic A8. This causes logic A8 to apply positive voltage to energize rotate south relay RS. This relay closes its contact to operate the rotate motor control circuit to cause the fork to rotate counterclockwise. When the fork leaves its north position, limit switch LSN in FIG. 10 opens without effect. As the fork rotates through its middle or west position, limit switch LSM closes momentarily without effect.

When the fork reaches its south position called for by the punched card, limit switch LSS in FIG. 10 closes to stop the rotary motion and to step the program to step 12. For this purpose, limit switch LSS applies positive voltage from power line PL3 to NOT logic N27 and to conductor SLS. Logic N27 inverts this positive voltage to zero voltage to close logic A59 and thereby terminate the rotate south signal from passing therethrough. This causes restoration of relay RS and reopening of its contact to stop the rotary motion.

The positive voltage on conductor SLS in FIG. 10 steps the program to the next step. This voltage is applied through logic OR9 in FIG. 4 to AND logic A10. As the bridge, trolley and hoist are now in positions called for by the punched card, positive voltages on conductors B0, T0 and H0 operate logic A12 in FIG. 3 to apply positive voltage to a second input of logic A10. The third input of the latter is supplied with positive voltage from power line PL3 through the contact of program relay PR11, conductor 11 and logic OR10. Consequently, the closing of limit switch LSS causes logic A10 to apply a positive voltage through logic OR11 to the STEP conductor to advance the program stepper to step 12.

In step 12 of the program, card reader No. 2 reads the following information from columns 19, 20 and 21 of the punched card, this being program 12B.

| | |
|---|---|
| Bridge | Same |
| Trolley | 24 |
| Hoist | Same |
| Rotate | Same |

From the foregoing, it will be apparent that only the trolley will be shifted, it being now in position 19 for rotation of the fork as aforementioned. It will be noted that this new trolley code 24 is the same code as was read in step 10 where it was ascertained that the trolley must go to a new aisle for retrieve purposes.

The trolley then operates as hereinbefore described by way of its trolley north relay TNR to run the trolley to its binary code position 24. When this has been completed, a positive voltage on trolley stopping indicating conductor T0 is fed back to advance the program to step 13. The trolley is now opposite the retrieve aisle and the bridge and hoist can be operated to move the fork in the aisle adjacent the retrieve bin. For this purpose, the card reader reads the following information at step 13—

Step 13:

| | |
|---|---|
| Bridge | 30 |
| Trolley | Same |
| Hoist | 12 |
| Rotate | Same |

These codes upon being read will operate the system to move the bridge and hoist concurrently to the positions 30 and 12 as indicated and their stopping signals on conductors B0 and H0 will be applied to advance the program to step 14.

It will be appreciated that the retrieve positions of the hoist are predetermined so that the fork will stop just below the centerline of the bin so that it can be moved below the article in the bin, raised one step to pick up the article and the trolley then backed into the aisle. Code 12 stopped the hoist in such position. Accordingly, in step 14 the card reads the following codes to cause side motion of the trolley, moving the fork into the bin—

Step 14:

| | |
|---|---|
| Bridge | Same |
| Trolley | Same and CTD |
| Hoist | Same |
| Rotate | Same |

This causes operation of the trolley in a manner similar to that hereinbefore described in connection with step 4 of the storing cycle to move the fork into the bin except that the trolley moves south. When the fork moves into the bin beneath the load, the latter actuates load limit switches FRS, FMS and FLS in FIG. 6 to close the same and apply positive voltages to the three inputs of logic A3 to stop side motion. As a result, logic A3 applies positive voltage through full load conductor FL to AND A60 in FIG. 14. The other input of logic A60 receives positive voltage through contact 2 of program relay PR14. As a result, logic A60 applies positive voltage through logic OR34 to one input of logic A50 whereas the other input thereof receives positive voltage from conductor TL0 when the trolley is not at the code position called for by the punched card. The positive voltage output of logic A50 causes the trolley to stop with the fork in the bin in the manner hereinbefore described. The program stepper is advanced to step 15 by coincident positive voltages applied to conductor 14 by program relay PR14, conductor SLS by rotate limit switch LSS and conductor ST4 from logic A50 in FIG. 14. These voltages operated logic A11 in FIG. 4 to advance the stepper to step 15.

In order to pick up the article, the fork must now be raised one position and backed into the aisle. To this end, the card reader reads the following codes in step 15—

Step 15:

| | |
|---|---|
| Bridge | Same |
| Trolley | Same and Same |
| Hoist | 13 |
| Rotate | Same |

This reading operates the hoist to raise the fork one position thereby to pick up the load thereon. Also, the hoist stopping signal on conductor H0 is applied to logic A55 in FIG. 14 and positive voltages from logics N23 and OR31 cause reversal of the trolley torque to back it north back into the aisle thereby retrieving the load from the bin. When the trolley reaches the position in the aisle called for by the punched card, a positive voltage on conductor T0 causes the program to be advanced to step 16.

What remains to be done now in the remainder of the retrieve cycle is to move the bridge to the west aisle and to hoist the fork to rotate position 9, then move the trolley to a selected set-down station 9 or 19 and rotate the fork to the middle position, then lower the load onto the selected station at hoist position 6, then after a suitable time delay allowing removal of the load from the set-down station, raise the emptying fork to its rotate position at hoist position 9, then move the trolley to its home position 34, and finally lower the fork to pickup elevation at hoist position 6 and clear the system.

To move the bridge to the west aisle and to raise the load to its rotate elevation, the card reader reads the following codes from columns 31, 32 and 33 at step 16—

Step 16:

| | |
|---|---|
| Bridge | 4 |
| Trolley | Same |
| Hoist | 9 |
| Rotate | Same |

This will cause the bridge to start moving from position 30 to position 4 and with the short delay of timer T7 will cause the hoist to lower the load from position 13 to position 9. When these positions are reached, stopping signals on conductors B0, H0 and T0, stepper signal on conductor 16 and rotate signal on conductor SLS in FIG. 4 will operate logic A10 in FIG. 4 to advance the program one step.

In step 17 of the retrieve cycle, the trolley will move to the selected set-down station and when it arrives there, the load will be rotated to the middle position so that the load can be set down on an exit conveyor for removal. A set-down station select switch SDS of the manual type is provided in FIG. 8. This switch is arranged so that contacts 1, 3 and 5 are normally closed and select set-down station No. 1 at trolley code position 9. For this purpose, contacts 1, 3 and 5 close points in the circuits for programs 17, 18 and 19, respectively, to normally allow use of these programs while contacts 2, 4 and 6 are normally open. To select the other set-down station at trolley code position 19, the switch is actuated to open contacts 1, 3 and 5 and to close contacts 2, 4 and 6 thereby to close points in the circuit of programs 17A, 18A and 19A as shown in FIGS. 8 and 19. If the switch is left in its actuated position, then all the retrieved loads will be delivered to set down station No. 2.

If switch SDS is left in the position shown, at step 17 the card reader reads the following informatoin from columns 34, 35 and 36 of the punched card—

| | |
|---|---|
| Bridge | Same |
| Trolley | 9 |
| Hoist | Same |
| Rotate | West |

This information will cause the trolley to move to the set-down position 9 while rotation is delayed. When the trolley reaches position 9, trolley code recognition circuit TCR in FIGS. 6 and 7 operates AND logic A6 in FIG. 10 to apply a rotate permissive signal through logic OR7 to timer T3. The rotate code is applied by the card reader as positive voltage on conductor CRM in FIG. 10 to a first input of AND logic A61, the voltage on conductor CRM going also directly to energize rotate middle relay RM. This relay opens its contact to condition the rotate motor control so that it will slow down for the middle position. A second input of AND logic A61 receives positive voltage from NOT logic N4 since limit switch LSN is open. The third input of logic A61 receives positive voltage from NOT logic N28 since limit switch LSM is open. As a result, logic A61 applies positive voltage through logic OR8 to one of the two inputs of logic A7 in the circuit of rotate north relay RN.

After a suitable delay of three seconds or the like to allow the trolley to come to a complete stop, timer T3 applies positive voltage to logic A7 to permit the rotate control signal to pass. That is, a positive voltage rotate control signal is applied from logic A61 through logics OR8 and A7 to energize rotate north relay RN. This relay closes its contact to operate the rotate motor control circuit to cause clockwise rotation of the mast and fork. When the fork leaves its south position, limit switch LSS opens without effect. When the fork reaches its middle position, limit switch LSM closes to stop the rotate motor. Limit switch LSM applies positive voltage from power line PL3 to NOT logic N28 which inverts it to zero voltage at one input of logic A61. This causes restoration of relay RN. The contact of relay RM being open, the rotate motor control circuit is preset for a slowdown function in response to a limit switch or the like when the fork approaches the middle position. The restoration of relay RN at the middle position then causes the fork rotation to stop.

Limit switch LSM also applies positive voltage from power line PL3 through conductor MLS to one of the three inputs of AND logic A62 in FIG. 4. The latter receives a second positive voltage input from logic A12 since the bridge, trolley and hoist are stopped and receives the third positive voltage input from power line PL3 through the contact of program relay PR17 and conductor 17. This causes logic A62 to apply a positive voltage through logic OR11 to the STEP conductor to advance the program stepper ST to step 18.

The loaded fork is now directed westerly above set-down station No. 1 and it must be lowered onto the conveyor thereat. This is done by card reader No. 2 reading the following information from columns 40, 41 and 42 of the punched card:

| | |
|---|---|
| Bridge | Same |
| Trolley | Same |
| Hoist | 6 |
| Rotate | Same |

This will cause operation of the hoist to lower the load from position 9 to position 6 whereby to deposit the load on the exit conveyor at setdown station No. 1.

The exit conveyor at setdown station No. 1 may then be started to convey the article off the fork thereby to advance the program to step 19. When the article leaves the fork, fork limit switches FRS, FMS and FLS reopen in FIG. 6 to switch all three inputs of logic OR38. The zero voltage output is inverted in NOT logic N29 to apply positive voltoge to timer T14 to develop a delayed "fork empty" signal.

Referring to FIG. 3, it will be seen that positive voltage is applied from logic A12 also to one of the four inputs of AND logic A63 in FIG. 4. Another input of the latter receives positive voltage from conductor MLS. A third input of logic A63 receives positive voltage from power line PL3 through the contact of program relay PR18 and conductor 18.

After a time delay of five seconds or the like sufficient to allow the load to clear the fork completely, timer 14 in FIG. 6 applies positive voltage as a fork empty signal through conductor FE to the fourth input of logic A63 in FIG. 4 to advance the program stepper one step. It will be apparent that a suitable detector switch or the like may be provided to start the exit conveyor running in response to lowering of the load onto the exit station and for automatically stopping such conveyor after a limit of travel when the deposited article has completely cleared the fork. The four inputs to logic A63 in FIG. 4 cause it to apply a positive voltage through logic OR11 to the step conductor to advance the stepper to position 19.

At this step of the retrieve cycle, the empty fork is raised to position 9. To this end, the card reader reads the following codes:

| | |
|---|---|
| Bridge | Same |
| Trolley | Same |
| Hoist | 9 |
| Rotate | Same |

As will be apparent, only the hoist position will be changed from 6 to 9 and the hoist zero signal on conductor H0 then advances to program the step 20 via AND logic A62 in FIG. 4.

In this step, the trolley is moved to its home or pickup position at binary code 34. For this function, the card reader reads the following codes:

| | |
|---|---|
| Bridge | Same |
| Trolley | 34 |
| Hoist | Same |
| Rotate | Same |

This reading will cause the trolley to move over its pickup position while the bridge remains in the west aisle, the hoist remains at position 9 and the fork remains directed to the west. The trolley zero signal on conductor T0 then advances the program to step 21 via AND logic A62.

The fork must now be lowered to its pickup position wherein the entry conveyor can transport an article thereon. To this end, the card reader reads the following codes:

| | |
|---|---|
| Bridge | Same |
| Trolley | Same |
| Hoist | 6 |
| Rotate | Same |

This causes the hoist to lower the fork to hoist binary code position 6 to enable the fork to be loaded by the input conveyor. When this has been done, the hoist zero signal on conductor H0 will be applied through logic A62 to advance the program stepper to the last step 22.

The retrieve cycle has now been completed and all that remains to be done is to clear the system. In program step 22, program relay PR22 is energized and closes its contact 1 and opens its contact 2 in FIG. 4. Contact 2 interrupts the circuit of relay GOR to clear the system, that is, to restore it to its original condition. Contact 1 applies positive voltage from power line PL3 through conductor 22 and logic OR11 to the STEP conductor to advance the stepper one step from step 22. As there is no output from the step beyond step 22, this stepping action is without effect except that relay PR22 is restored to reopen contact 1 and reclose contact 2.

Relay GOR being deenergized as aforesaid, reopens its contact 1 to open its self-maintaining circuit so that it will not reenergize when relay PR22 is restored. Relay GOR reopens its contact 2 in the circuit of relay LR without effect at this time. All of the program relays PR1 through PR22 are now deenergized and the system is cleared so that the punched cards can be removed from the card readers. A new storing and retrieving cycle can be initiated by placing new punched cards in the two card readers and pressing the GO pushbutton.

FULL BIN DETECTION

The manner in which the system operates if a bin is found to be full when an article is attempted to be placed therein on a store cycle will now be described. This will involve the operation of relay LR in FIG. 5. Load amps sensing relay LASR in FIG. 3 will be energized to to indicate that the bin is full and this relay will close the circuit of relay LR. Relay LASR senses increase in the trolley motor primary current from the normal value which it has when slow side motion of the trolley is taking place. The operating device of relay LASR may be connected through a current transformer or the like to one phase of the three-phase lines that go to the trolley motor primary winding.

When power is first connected to the trolley motor, the current will go high and operate relay LASR. However, this will not energize relay LR because timing relay TTR is interposed therebetween. When power is connected to the trolley motor initially, trolley timing relay TTR is energized by the trolley motor control but does not close its contact right away. After the trolley motor current has decreased to normal value and relay LASR has deenergized, the timing closing contact of relay TTR closes. This presets the system so that if a full bin is detected during the store cycle, the load will be returned to the pickup station and the system will be cleared as more fully described hereinafter.

To describe this function of the system, it will be assumed that the store cycle hereinbefore described is at step 4 shown in FIG. 18 and side motion of the trolley is taking place to move the loaded fork into the bin. At this time according to the typical store program cycle shown in FIG. 18, the bridge is at position 20, the trolley is moving into the bin from position 28, the hoist is in position 7 and the fork is directed north.

The bin being full in that an article or bundle is already therein, the loaded fork cannot enter the bin but will engage the article in the bin. This will place an added load on the trolley motor and cause its current to go up. This increase in current will be detected immediately and energization of load amps sensing relay LASR takes place. This detection will be performed smoothly as soon as the fork or the load therein touches the article in the bin so that it is hardly noticeable and the load will start to back out as hereinafter described.

Relay LASR closes its contact to energize relay LR in a circuit extending from power line L1 through the contact of relay TTR and contact 2 of relay GOR and the operating coil of relay LR to power line L2. Relay LR closes its contact 1 to complete a self-maintaining circuit in shunt of the contacts of relays LASR and TTR to maintain it energized until the system is cleared. Relay LR opens its contact 2 to place relay GOR under the control of contact 2 of program relay PR10. Furthermore, relay LR interrupts the storing cycle and selects an alternate program whereby the load is returned to the starting point. To this end, relay LR opens contacts 3, 5, 7, 9 and 11 to discontinue the remainder of the storing cycle and closes contacts 4, 6, 8, 10 and 12 to select the load return cycle consisting of programs 5A, 6A, 7A, 8A and 9A shown in FIG. 18. Moreover, relay LR closes its contact 13 in FIG. 14 to reverse the trolley back into the aisle as follows:

It will be recalled that in the store cycle the trolley was moving north into the bin. When the full bin is detected, it is necessary to restore relay TNR and to energize relay TSR to move the load south back into the aisle. Contact 13 of relay LR applies positive voltage through logic OR34 in FIG. 14 to one of the two inputs of logic A50. The other input receives positive voltage from conductor TL0 since the trolley is away from the position called for by the punched card to cause logic A50 to apply positive voltage output to stop the trolley and to advance the program stepper to step 5 thereby activating program 5A which calls for the trolley to back into the aisle. As contact 13 of relay LR is in parallel with switch ULTR, this stopping of the trolley and advancing of the program stepper is done in the same manner as hereinbefore described in connection with proximity switch ULTR. In program 5A, the trolley is reversed right after the three second delay of timer T10 (FIG. 14) without having to wait for hoist lowering one position as in the case of a normal store cycle. The trolley zero signal on conductor T0 then advances the program stepper one step to activate program 6A. This calls for movement of the bridge to the west aisle at binary code 4 and raising the load to hoist position 9. When this is done, the stepper is advanced by signals on conductors B0 and H0 one step to activate program 7A. This calls for movement of the trolley to home position 34 above the pickup station. When this has been done, the zero trolley position signal in conductor T0 advances the stepper one step to position 8.

In step 8, card reader No. 1 activates program 8A which causes rotation of the loaded fork counterclockwise from north to middle position. When this has been done, AND logic A62 in FIG. 4 will be used to provide a stepping voltage. Logic A12 and conductor MLS will apply positive voltages to two of the three inputs of logic A62. Relay LR will have closed its contact 14 and opened its contact 15 in FIG. 4. As a result, the third input of logic A62 will receive positive voltage from power line PL3 through the contact of program relay PR8, conductor 8 and contact 14 of relay LR. The positive voltage output of logic A62 is used to advance the program to step 9.

In step 9 the card reader will activate program 9A which calls for the load to be set down at the pickup station and for clearing the system in step 10. The load is set down by lowering the fork to hoist position 6. When this has been done, the positive voltage on conductor H0 will be used to advance the stepper to position 10 in the same manner as it was advanced from step 8 to step 9. The load has now been returned to its starting position.

In step 10, the system is cleared when program relay PR10 opens its contact 2 in FIG. 4. It will be recalled that the circuit of relay GOR (FIG. 3) extends through contact 2 of relay LR in FIG. 5 and contact 2 of relay PR10 in parallel. Contact 2 of relay LR opened when a full bin was detected and has been maintained open. Thus, when contact 2 of relay PR10 also opens one step after the load has been returned to the pickup station, it deenergizes relay GOR which in turn reopens its contact 1 to interrupt its self-maintaining circuit and opens its contact 2 to deenergize relay LR. Contact 1 of relay GOR also deenergizes timing relay TR which recloses its contact 1 in the circuit of relay GOR and reopens its contact 2 to disconnect the positive voltage from power line PL3. This clears the system to its original condition with automatic control relay ACR left energized so that the punched card which attempted to route an article into an already full bin can be removed and a new card inserted into the card reader and the GO button pressed to start another store cycle.

It will be recalled that relays NAS and TAR were energized and maintained. When the system is cleared as aforesaid these two relays will remain energized because the logics controlling them are supplied from power supply circuit DC1 in FIG. 3 which remains energized by relay ACR. Thus, it is necessary to provide a reset signal to restore these two relays. This reset signal is applied when the next cycle is started by pressing the GO button. Contact 2 of the GO switch in FIG. 3 applies positive voltage from power line PL1 through reset conductor RST to NOT logic N21 in FIG. 10. This NOT logic inverts this to zero voltage to switch one input of each AND logic A48 and A58 to zero voltage. As a result, the positive voltage outputs of these AND logics are terminated to deenergize relays NAS and TAR.

CYCLE BYPASS

The system is provided with means to afford card reader bypass whereby the store cycle can be bypassed and only the retrieve cycle used to retrieve an article from the warehouse to a selected setdown station or the retrieve cycle can be bypassed and only the store cycle and the return portion of the retrieve cycle used to store an article and to return the empty fork to the pickup station.

STORE BYPASS

The store bypass operation will now be described.

For this purpose, a bypass card is inserted in card reader No. 1 and a regular retrieve coded card may be inserted in card reader No. 2 so that an article will be retrieved after the store cycle is bypassed. When the store cycle is to be bypassed, the fork is not loaded at the pickup station. Thus, fork limit switches FRS, FMS and FLS in FIG. 6 remain open. After the GO button has been pressed, a positive voltage fork empty signal is applied from timer T14 in FIG. 6 through conductor FE and logic OR23 in FIG. 13 to one of two inputs of AND logic A34 to permit east motion of the bridge and to one of three inputs of AND logic A64 to permit west motion of the bridge if the bridge is not in the west cross aisle.

As long as the bridge is in the west cross aisle at its binary code position 4, west motion thereof is locked out. This is done by taking the positive voltage output signal on conductor B4 of bridge code recognition circuit BCR in FIGS. 6 and 7, inverting it to zero voltage in NOT logic N30 in FIG. 10 and applying this zero voltage through conductor BWA to a second input of AND logic A64 in FIG. 13 to prevent energization of bridge west relay BWR. As soon as the bridge has been moved away from its west cross aisle, conductor BWA switches to positive voltage which gates AND logic A64 to permit energization of relay BWR.

Returning to the store bypass operation, the fork empty signal permits bridge motion. A fork loaded signal FL also permits bridge motion since it is applied to the other input of logic OR23 in FIG. 13 whenever the fork is loaded. These fork empty and fork loaded signals are used to interlock the bridge so that the bridge cannot be moved if the load is skewed or split.

A fork empty indicative position voltage, is also applied from the output of logic N29 in FIG. 6 through conductor FES and logic OR6 to one of the three inputs of AND logic A6 in rotate restriction circuit PRC in FIG. 10. This input of AND logic A6 receives positive voltage also from output conductor T34 of trolley code recognition circuit TCR and then through logic OR6 but this voltage will terminate as soon as the trolley moves out of position 34 so that the fork empty signal is required to permit rotation of the empty fork. A second input of AND logic A6 receives positive voltage from output conductor B4 of bridge code recognition circuit BCR since the bridge is in the west cross aisle. The third input of AND logic A6 will permit rotation after the hoist is raised from position 6 to position 9.

The bypass card inserted in card reader No. 1 has the following codes for step 1—

| | |
|---|---|
| Bridge | 4 |
| Trolley | 34 |
| Hoist | 9 |
| Rotate | Middle |

The card will have a bypass code CBP for steps 2 through 9 and the following codes for step 10:

| | |
|---|---|
| Bridge | 4 |
| Trolley | No code |
| Hoist | 9 |
| Rotate | Middle |

Referring to the step 1 codes, it will be apparent that since the bridge and trolley are in the positions called for and the fork is in the middle rotary position called for, only the hoist will operate to binary code position 9.

Three coincident signals are required to step the program stepper ST to step 2. A first positive voltage is applied from power line PL3 through the contact of program relay PR1 and conductor 1 to a first input of AND logic A65. A second input of logic A65 receives positive voltage from conductor MLS since the fork is in the middle position. When the hoist reaches position 9, the positive voltage on conductor H0 is applied through AND logic A12 in FIG. 3 to timer T15 which delays it five seconds or the like and then applies it to the third input of AND logic A65 to advance the stepper to step 2.

At step 2 the card reader will read a bypass signal which consists of positive voltage on bypass conductor CBP. This positive voltage is applied from power line PL3 through the contact of relay PR2, conductor **2*a* and card reader No. 1 to conductor CBP from where it is applied through conductor 22 and logic OR11 to advance the stepper to step 3**.

In a similar manner, a bypass signal is read at steps 3 through 9 to advance the stepper to step 10.

At each of these steps 2 through 9, the bypass positive voltage signal will also be applied through conductor NBP in FIG. 4 as a lockout signal to prevent trolley movement whereas bridge and hoist movements are prevented by other means. Since only a bypass signal is read by the card reader whereas the proximity readers read actual position codes for the bridge, trolley and hoist, it will be apparent that the three binary subtractors will provide difference binary codes. The bridge is at binary code position 4 which is read by the bridge proximity reader. Since no bridge code is read by the card reader, zero subtracted from 4 causes the bridge binary subtractor to provide a difference code of 4 and a positive or west directional signal. But since the bridge is in the west cross aisle, it will be prevented from moving further west by a lockout signal on conductor BWA. For this purpose, the positive voltage on output B4 of bridge code recognition circuit BCR in FIGS. 6 and 7 is inverted in logic N30 in FIG. 10 and the zero voltage on conductor BWA is applied to one of the three inputs of AND logic A64 in FIG. 13 in the circuit of bridge directional relay BWR to prevent westerly movement.

Trolley movement is locked out by the bypass signal. The card reading of zero is subtracted from the proximity reader reading of 34 to provide a difference and a trolley south directional signal S from the trolley binary subtractor. To prevent trolley movement south, the bypass signal is applied from conductor CBP through conductors 22 and NBP to logic N7 in the trolley direction and slowdown circuit in FIG. 12. This positive voltage is inverted in NOT logic N7 to apply zero voltage to one of the three inputs of AND logic A16. The output of logic A16 remains at zero voltage which is applied through timer T5 to both trolley directional AND logic A13 and A14 to prevent trolley control signals from passing therethrough. As a result, the trolley is prevented from moving at steps 2 through 9 of the program.

Hoist movement is locked out during the store bypass by a signal on conductor STP. The bypass signal which is a positive voltage is applied from conductor CBP through conductor 22 and logic OR11 to the STEP conductor as aforesaid to step the program to position 3. This same positive voltage is applied from logic OR11 through conductor STP to and through timer T6 in FIG. 14 and through logics OR2 and OR3 in FIG. 13 to NOT logic N2. The latter inverts this positive voltage to zero voltage which is applied to AND logics A2 and A23 in FIG. 14 to lock out hoist up and down movement.

It will be apparent that the zero voltage output of NOT logic N2 in FIG. 13 is also applied to AND logics A21 and A22 to lock out bridge movement as to both west and east in addition to the bridge west lockout received on conductor BWA. Also, the positive voltage on conductor STP is applied through timer T6 and logic OR17 in FIG. 14 and is inverted in logic N11 to apply zero voltage lockout to trolley movement at logics A20 and A35 in FIG. 13.

Rotary movement of the fork does not take place during store bypass because no rotary command codes are received from the card reader.

In the above manner, the bypass signal steps the program to step 10. In this position, card reader No. 1 reads the following codes:

| | |
|---|---|
| Bridge | **4** (same) |
| Trolley | No code |
| Hoist | **9** (same) |
| Rotate | Middle (same) |

Card reader No. 2 concurrently reads the following codes:

| | |
|---|---|
| Bridge | No code |
| Trolley | X (retrieve aisle) |
| Hoist | No code |
| Rotate | No code |

It will be apparent that this is the step of the program wherein control of the system is transferred from card reader No. 1 to No. 2 and the codes are similar to those hereinbefore described wherein card reader No. 2 checked to ascertain whether the retrieve cycle required the trolley to move to a new aisle. If a new aisle is required for the trolley for the retrieve cycle, the program stepper will be advanced to step 11 in the manner hereinbefore described. If the article to be retrieved is in the same aisle at trolley binary code position 34, the stepping signal is obtained through logic A66 in FIG. 3. To this end, a positive voltage is applied from output 10 of stepper ST to one of the two inputs of logic A66. The other input of logic A66 receives positive voltage from output B4 of bridge code recognition circuit BCR in FIG. 7 through conductor S10. The positive voltage output of logic A66 is applied through logic OR9 to one of the three inputs of AND logic A10. Another input of logic A10 receives positive voltage from logic A12 as the bridge, trolley and hoist are in the positions called for by the punched cards. The third input of logic A10 receives positive voltage from power line PL3 through contact 1 of relay PR10, conductor 10, contact 1 of relay NAS and logic OR10. As a result, logic A10 applies positive voltage through logic OR11 to the STEP conductor to advance the program to step 11. In this position, card reader No. 2 initiates the retrieve cycle as hereinbefore described.

RETRIEVE BYPASS

The retrieve bypass operation will now be described. For this purpose, a store card will be inserted in card reader No. 1 and a retrieve bypass card will be inserted in card reader No. 2.

When the store cycle has been completed, the stepper is advanced to step 11 and the empty fork will be in the aisle adjacent the store bin. The retrieve bypass cycle consists of advancing the program stepper from step 11 to step 20 and locking out all motions and then using steps 20 and 21 to bring the fork back to the pickup station. For this purpose, card reader No. 2 reads bypass signals and applies positive voltage on conductor CBP to advance the stepper from step 11 to step 20. During these steps, bridge, trolley and hoist motions are locked out in the manner hereinbefore described in connection with store bypass.

At position 20 of the retrieve bypass cycle, card reader No. 2 reads the following codes:

| | |
|---|---|
| Bridge | **4** |
| Trolley | **34** |
| Hoist | **9** |
| Rotate | Middle |

Assuming that the bridge, trolley and hoist were at some positions other than the above at the end of the store cycle, the motions back to their home positions will take place in a predetermined order as hereinafter described. The fork will be in either the north or south position at the end of the store cycle.

Trolley restriction circuit TRC in FIG. 10 will prevent trolley motion until the bridge and hoist have reached the positions called for by the bypass card. Also, rotate restriction circuit RRC will prevent rotary motion of the fork until the bridge and hoist have reached the positions called for by the bypass card. However, since the fork is empty, rotary motion of the fork is not limited to certain trolley positions but may take place anywhere in the west cross aisle.

In response to the above codes, the bridge will move to the west cross aisle and the hoist will concurrently move the fork to binary position 9. This causes circuit TRC in FIG. 10 to apply a trolley permissive signal on conductor TC1 to allow the trolley to move to its pickup station at binary position 34. At the same time, a fork empty signal is applied from conductor FES in FIG. 6 through logic OR6 to logic A6 in FIG. 10 which along with the bridge and hoist inputs provides a rotate permissive signal through logic OR7 and timer T3 to AND logics A7 and A8 in the rotate control circuit. This allows the rotate code read from the bypass card to cause rotation of the fork to the middle position.

When the bridge, trolley and hoist are in the positions called for and the fork is in the middle position, AND logic A62 in FIG. 4 operates to cause the program to be advanced to step 21.

In this position, the card reader reads the following codes from the bypass card:

| | |
|---|---|
| Bridge | Same |
| Trolley | Same |
| Hoist | 6 |
| Rotate | Same |

In response to these codes, the fork is lowered to pick-up position 6 and the stepper is advanced to step 22 in the manner hereinbefore described in connection with the retrieve cycle. Also, as described therein, the system is cleared and the stepper is advanced to vacant step 23 from which it may be cleared and reset when the next cycle is started.

PARALLEL BINARY SUBTRACTOR

Referring to FIGS. 15 and 16, there is shown a binary subtractor which is usable in the system of FIGS. 3–14. This binary subtractor is usable for the bridge binary subtractor BBS shown as a rectangle in FIG. 9 and with slight modifications is also usable as the trolley binary subtractor TBS and the hoist binary subtractor HBS shown as rectangles in FIG. 9. The subtractor is illustrated in a form capable of accommodating seven bit binary codes so that it is usable as the bridge binary subtractor BBS in FIG. 9 since seven bit binary codes are used for bridge positioning. Six bit binary codes are used for trolley and hoist positioning so that the illustrated subtractor may be modified by connecting the directional output circuit to the penultimate circuit in the second stage and omitting the last circuit in each stage.

The binary subtractor is provided with two parallel inputs for simultaneous subtraction of all bits of the binary codes. The first input shown in FIG. 15 is designated as register A and corresponds to one of the readers such as the bridge proximity reader BPR in FIG. 6. As indicated in FIG. 15, this register A puts the minuend into the subtractor, that is, the binary code from which another binary code is subtracted. The second input shown in FIG. 15 is designated as register B and corresponds to one of the readers such as card reader No. 1 in FIG. 5. As indicated in FIG. 15, this register B puts the subtrahend into the subtractor, that is, the binary code that is subtracted from the minuend.

Register A comprises a contact and a signal converter for each of the seven bits of the binary code connected to suitable power supply sources. As shown in FIG. 15, register A contacts A1, A2, A4, A8, A16, A32 and A64 which are normally open are connected between a positive 48 volt direct current source and first terminals of respective signal converters SC1 to SC7. Second terminals of these signal converters are connected in common to the zero voltage side of the D.C. source. Third terminals of these signal converters are connected in common to a positive 10 volt source and fourth terminals of the signal converters provide binary bit outputs in accordance with the closure of the register A contacts. As will be apparent, the contacts of register A are provided with reference characters consisting of a letter A indicating register A and a number indicating the binary bit value or significance.

Signal converters SC1 and SC7 are alike and the details thereof are shown in FIG. 17. As shown therein, the plus 48 volt source is connected through resistors R1 and R2 to the zero volt side of the source. The junction of these resistors is connected through a unidirectional diode D in its forward, low impedance direction to a plus 10 volt source shown in FIG. 3. The output terminal is connected to the junction of resistors R1 and R2. As will be apparent, if resistors R1 and R2 are given the ohmic values shown, current will flow from the 48 volt source to the zero volt conection through the resistors in series and the voltage at the junction would tend to be slightly above 10 volts which would be reduced as follows. Any excess voltage at the junction above 10 volts will cause current flow through diode D to the plus 10 volt connection. Consequently, this signal converter will maintain a constant 10 volts at the output terminal whenever the 48 volt source is connected. When the 48 volt source is disconnected as by the register contact A1 in FIG. 15, the voltage at the output terminal will drop to zero D.C. value. It may be assumed that the voltages provided by the signal converter are required for proper operation of the logic circuits in the subtractor.

Register B similarly comprises a contact and a signal converter for each of the seven bits of the binary code connected to the same power supply sources. As shown in FIG. 15, register B contacts B1, B2, B4, B8, B16, B32 and B64 which are normally open are connected between the positive 48 volt source and first terminals of signal converters SC8 to SC14, respectively. These signal converters are identical to those hereinbefore described and have second terminals connected to zero volts, third terminals connected to the plus 10 volt source and fourth terminals providing binary bit inputs to the subtractor in accordance with operation of the contacts.

The subtractor in FIGS. 15 and 16 is basically a binary code adder but it can also perform subtraction indirectly when used in a particular manner. Subtraction can be performed by inversion and addition in the following manner.

When the subtrahend is smaller than the minuend, subtraction can be performed by inverting the subtrahend and adding it to the minuend to obtain the sum and then adding the carry that comes from the most significant binary bits of such addition to the least significant bit of such sum. This gives a direct remainder which is a binary number. Under this condition there will always be a carry.

When the subtrahend is larger than the minuend, subtraction can be performed by inverting the subtrahend and adding it to the minuend to obtain the sum. Under this condition, there will never be the carry mentioned under the first condition above. This gives an inverse remainder which must then be inverted to obtain the direct remainder which is a binary number.

Under both conditions of subtraction mentioned above the subtrahend must be first inverted. For this purpose, the seven binary bit inputs from signal inverters SC8 to SC14 in FIG. 15 are connected through NOT logics N1 to N7, respectively, to the first stage of the subtractor circuit.

The subtractor circuit shown in FIGS. 15 and 16 comprises three sets or stages of logic circuits for each bit of the seven bit binary number except the first, least significant bit which has only two stages of logic circuits. The second stage can be omitted because, being the first bit, there is no carry-in from a less significant bit, there being no less significant bit. However, the logic circuits for the second and succeeding bits have all three stages including the second stage because there is the possibility of a carry-over of a digit as a result of an addition of less significant bits. The circuits of the first stage are shown arranged in a column in FIG. 15 and include one adder circuit for each pair of equal significance binary bits in the minuend and subtrahend. Thus, for the seven bit binary numbers, there are provided seven adder logic circuits as shown in FIG. 15. The circuits of the second stage are shown arranged in a column at the left-hand portion of FIG. 16 and include one adder circuit for each adjacent pair of adder logic circuits of the first stage. That is, there is one second stage adder circuit for the first and second adder circuits of the first stage, another second stage adder circuit for the second and third adder circuits of the first stage, etc., for a total of six second stage adder circuits. The circuits of the third stage are shown arranged in a column at the right-hand portion of FIG. 16 and include one adder circuit for each adder circuit of the first stage as hereinafter more fully described.

Since the subtractor does not literally subtract one number from another but in effect performs a subtraction by inversion and addition, it will be apparent that the circuits in the first stage comprise adder circuits. Each adder circuit receives equal significance binary bits of the minuend and the inverted subtrahend and adds them to provide the sum and no carry or the sum and carry depending upon the values of the bits added. For this purpose, each adder circuit comprises an OR logic OL to which both equal significance binary bits are applied, a first AND logic AL1 to which both such equal significance binary bits are applied, a NOT logic NL for inverting the output of the first AND logic and a second AND logic AL2 for receiving the outputs of the OR logic and the NOT logic. The OR logic will receive both binary bits and will provide a "1" output if one or both binary bits are a "1." The first AND logic will receive both binary bits and will provide a "1" output only if both binary bits are "1." The output of the first AND logic is inverted by the NOT logic and applied to one of the two inputs of the second AND logic. The sum of the binary bits is taken from the output of the second AND logic AL2 and the carry, if any, is taken from the output of the first AND logic AL1. In this manner, if the binary bits to be added are either "1" or "0" or "0" and "1," the sum will be "1" and there will be no carry. If the binary bits to be added are "1" and "1," the sum will be "0" and there will be a carry "1." If the binary bits to be added are both "0," the sum will be "0" and there will be no carry. In this manner, the adder circuits in the first stage function simultaneously in parallel to add the two bits in each pair of equal significance binary bits and to provide the sums thereof on conductors 1S1 to 1S7 and the carry if any on conductors 1C1 to 1C7.

It will be appreciated that in the addition of binary numbers the carry "1" that comes from the addition of any pair of binary bits must be added to the next significant pair of binary bits. In the subtractor of FIGS. 15 and 16, this is done in the second stage of logic circuits. Actually in the second stage, the carry if any, is added to the sum of the pair of next significant binary bits since the latter have already been added in the first stage. For this reason, the second stage requires only six logic circuits for a seven bit subtractor. As shown in FIG. 16, each circuit of the second stage comprises an adder like that in the first stage with the addition of an OR logic output for the carry. This adder circuit comprises an OR logic OL1 to which is connected the carry output 1C1 of the first bit circuit of the first stage and the sum output 1S2 of the second bit circuit of the first stage. This adder circuit also comprises a first AND logic AL3 to which the aforesaid carry and sum outputs of the first and second bit circuits, respectively, of the first stage are also connected. The output of this first AND logic AL3 is inverted in a NOT logic NL1 and applied to one of the two inputs of a second AND logic AL4. The other input thereof receives the output of OR logic OL1. The sum of the inputs of this adder circuit is taken from AND logic AL4 at output 2S1 and the carry is taken from AND logic AL3 at output 2C1. It will be apparent that under some conditions this adder circuit in the second stage provides a carry on output 2C1 which must be added to the next significant bit. And under other conditions the second bit adder circuit of the first stage provides a carry on output 1C2 which must be added to said next significant bit. For these reasons, OR logic OL2 is provided at the carry output of the first adder circuit of the second stage. As shown in FIG. 16, carry outputs 1C2 and 2C1 are connected to this OR logic OL2 and its output 2C2 is applied to the next adder circuit of the second stage. The other five adder circuits in the second stage are similarly connected and provide sum outputs 2S2 to 2S6 and carry outputs 2C3 to 2C7.

Since the aforesaid method of subtraction by inversion and adding requires that the carry from the most significant bit of the sum must be added to the least significant bit of the sum, the third stage of adder circuits shown at the right-hand portion of FIG. 16 is required. The first adder circuit of this third stage is like the adder circuits in the first stage except for its input and output connections. OR logic OL3 and first AND logic AL5 receive a first input sum output 1S1 of the first adder circuit of the first stage. These two logics receive a second input from carry output 2C7 of the most significant bit adder circuit of the second stage. The output of the first AND logic is inverted in NOT logic NL2 and applied to one input of second AND logic AL6. The second input of the latter is received from OR logic OL3. The least significant bit final sum is taken at output FS1.

Since the addition performed in the first adder circuit of the third stage might under certain conditions produce a carry which must be added to the next significant bit sum, and the latter might also produce a carry, etc., six additional adder circuits, one for each bit of the remainder, are required in the third stage. The carry outputs 3C1 to 3C6 of the first six adder circuits are connected to inputs of the second through seventh adder circuits, respectively, as shown in FIG. 16. The remainder outputs bits are taken from the final sum outputs FS1, FS2, FS4, FS8, FS16, FS32 and FS64 of the respective adder circuits in the third stage.

The signal at the most significant bit output 2C7 of the second stage is indicative of the polarity of the remainder of the subtraction. That is, if the minuend is larger than the subtrahend so that the remainder is positive, a positive voltage will appear at output 2C7 in the second stage. If the minuend is smaller than the subtrahend so that the remainder of the subtraction is negative, zero voltage will appear on carry output 2C7 in the second stage. This will immediately be recognized as a convenient place to take a directional output signal for forward or reverse motor control or the like. For this purpose, carry output 2C7 is connected directly to forward directional output FOR and is connected through a voltage inverter NOT logic NL3 to reverse directional output REV.

It will be apparent from the foregoing that the subtractor circuit shown in FIGS. 15 and 16 is usable for the seven bit bridge binary subtractor BBS shown as a rectangle in FIG. 9. For this purpose, register B in FIG. 15 corresponds to the bridge code contacts of card reader No. 1 in FIG. 5 or card reader No. 2 in FIG. 8 as the case may be. Also, register A in FIG. 15 corresponds to the contacts of bridge code proximity reader BPR in FIG. 6.

The binary subtractor shown in FIGS. 15 and 16 may be modified for use as a six bit trolley binary subtractor TBS of FIG. 9 or the like six bit hoist binary subtractor HBS. This modification consists of omitting the last bit adder circuits from each of the three stages and transferring the following connections. The carry input to the least significant bit adder circuit of the third stage is transferred from carry output 2C7 which is omitted to carry output 2C6. Also, outputs FOR and REV and NOT logic NL3 are transferred to carry output 2C6.

While the invention hereinbefore described is effectively adapted to fulfill the objects stated, it is to be understood that we do not intend to confine our invention to the particular preferred embodiment of automatic storage and retrieval system disclosed, inasmuch as it is susceptible of various modifications without departing from the scope of the appended claims.

We claim:

1. A numerical positioning control system for controlling multiple coordinate movements of a driven device in plural dimensions comprising:

first reader means adapted to have recorded information bearing media inserted therein for reading sets of desired-position indicative digital codes therefrom;
digital coded means mounted along coordinate paths like the coordinate paths of movement of said device and being indicative of actual positions thereof;
second reader means movable in synchronism with said device for reading sets of actual-position indicative digital codes from said digital coded means at predetermined points as said device moves;
means for subtracting one of said sets of digital codes from the other set which is being read at the same time to obtain a set of difference digital codes each time a set of actual-position indicative digital codes is read;
means for providing directional output signals indicative of the polarities of the difference digital codes in said sets, that is, indicative of whether each difference digital code is plus or minus;
motor control means responsive to said directional signals for causing said device to be driven in said coordinate movements; and
means for causing said coordinate movements to be restricted to a predetermined order.

2. The invention defined in claim 1, together with:
means responsive to completion of the movements prescribed in each set of desired-position indicative digital codes for providing a program-advance signal; and
means responsive to said program-advance signal for causing the next set of desired-position indicative digital codes to be applied from said first reader means to said subtracting means.

3. The invention defined in claim 1, wherein said digital coded means comprises:
magnetic coded elements mounted along paths of movements of said device.

4. The invention defined in claim 3, wherein said second reader means comprises:
proximity switch means mounted on said device for movement therewith past said magnetic coded elements and being responsive to the magnetic codes on said elements.

5. The invention defined in claim 1, wherein said means for subtracting comprises:
a parallel subtractor of the solid element logic circuit type for comparing all of the digits of the desired-position indicative digital code against the respectively corresponding significance digits of the actual-position indicative digital code concurrently to obtain the difference digital code.

6. The invention defined in claim 5, wherein said digital codes are binary codes.

7. The invention defined in claim 1, wherein said means for providing directional output signals comprises:
a first output for providing a control signal when the difference digital code is positive due to the subtrahend being smaller in value than the minuend; and
a second output for providing a control signal when the difference digital code is negative due to the subtrahend being larger in value than the minuend.

8. The invention defined in claim 1, together with:
means for recognizing a predetermined actual-position indicative digital code for providing a lockout signal; and
means effective while said lockout signal persists for preventing operation of said motor control means in a predetermined direction to prevent movement of said device beyond its proper limit.

9. A numerical positioning control system for controlling multiple coordinate movements of a driven device in three dimensions comprising:
first reader means for receiving recorded information bearing media and for reading sets of desired-position indicative digital codes therefrom;
digital coded means mounted along multiple coordinate paths like the multiple coordinate paths of movement of said device and being indicative of actual positions thereof;
second reader means movable in synchronism with said device for reading sets of actual-position indicative digital codes from said digital coded means at predetermined points as said device moves;
means for subtracting one of said sets of digital codes from the other set to obtain a set of difference digital codes each time a set of actual-position indicative digital codes is read;
means in said subtracting means for providing directional output signals indicative of the polarities of the difference digital codes of said sets, that is, indicative of whether each digital code for each coordinate movement is plus or minus;
reversing motor control means responsive to said direction signals for causing said device to be driven in said coordinate movements; and
means for controlling said motor control means to cause said coordinate movements to be restricted to a predetermined order.

10. A positioning control system for controlling multiple coordinate movements of a driven device in plural dimensions comprising:
first means operable to insert into the system sets of desired-position indicative codes;
coded means mounted along coordinate paths like the coordinate paths of movement of the driven device and being indicative of actual positions thereof;
second means movable in synchronism with the driven device for extracting sets of actual-position indicative codes from said coded means at predetermined points as the driven device moves;
means for subtracting one of said sets of codes from the other set to obtain a set of difference codes each time a set of actual-position indicative codes is extracted;
means for providing directional output signals indicative of the polarities of the difference codes, that is, indicative of whether each difference code is plus or minus; and
motor control means responsive to said directional signals for causing the driven device to be driven in the coordinate movements in a predetermined order in accordance with the last provided directional signal and the last obtained difference code.

11. A numerical positioning control system for controlling multiple coordinate movements of a driven device in plural dimensions comprising:
first means adapted to be controlled by an operator and being operable to insert into the system sets of desired-position indicative digital codes;
digital coded means mounted along coordinate paths like the coordinate paths of movement of the driven device and being indicative of actual positions thereof;
second means movable in synchronism with the driven device for reading sets of actual-position indicative digital codes from said digital coded means at predetermined points as said driven device moves;
means for comparing the read set of digital codes with the inserted set to obtain a set of difference digital codes each time a set of actual-position indicative digital codes is read;
means for providing directional output signals indicative of the polarities of the difference digital codes in said sets, that is, indicative of whether each difference digital code is plus or minus; and
motor control means responsive to said directional signals for causing the driven device to be driven in the coordinate movements in a predetermined order in accordance with the last provided directional signal and the magnitude of the last obtained difference digital code.

References Cited

UNITED STATES PATENTS

| | | | |
|---|---|---|---|
| 2,853,664 | 9/1958 | Towns et al. | 318—28 |
| 2,988,681 | 6/1961 | Bower | 318—28 |
| 3,065,394 | 11/1962 | Wang | 318—28 |
| 3,080,512 | 3/1963 | Cubbidge et al. | 318—28 |
| 3,284,618 | 11/1966 | Götz et al. | 318—162 XR |
| 2,765,928 | 10/1956 | Reimenschneider | 212—135 |
| 2,918,656 | 12/1959 | Nolde et al. | 214—16.4 |
| 2,988,237 | 6/1961 | Devol | 214—16.4 |
| 3,061,111 | 10/1962 | Riemenschneider | 212—21 |
| 3,076,566 | 2/1963 | Dennis | 214—16.4 |
| 3,272,347 | 9/1966 | Lemelson | 214—16.4 |
| 3,297,379 | 1/1967 | Artaud | 214—16.4 |
| 3,402,836 | 9/1968 | Debrey et al. | |

FOREIGN PATENTS

| | | |
|---|---|---|
| 1,135,148 | 8/1962 | Germany. |

B. DOBECK, Primary Examiner

U.S. Cl. X.R.

318—28, 30